US012701506B2

(12) United States Patent
Abotabl et al.

(10) Patent No.: US 12,701,506 B2
(45) Date of Patent: Aug. 4, 2026

(54) TECHNIQUES FOR CONFIGURING CELL WAKE-UP SIGNAL IN WIRELESS COMMUNICATIONS

(71) Applicant: QUALCOMM Incorporated, San Diego, CA (US)

(72) Inventors: Ahmed Attia Abotabl, San Diego, CA (US); Marwen Zorgui, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 566 days.

(21) Appl. No.: 18/169,603

(22) Filed: Feb. 15, 2023

(65) Prior Publication Data

US 2024/0276365 A1      Aug. 15, 2024

(51) Int. Cl.
*H04W 52/02*          (2009.01)

(52) U.S. Cl.
CPC ............................... *H04W 52/0206* (2013.01)

(58) Field of Classification Search
CPC . H04W 52/0206; H04W 76/19; H04W 76/25; H04W 76/27; H04W 52/0235; H04W 52/0229; H04W 52/0216; H04W 52/0232; H04W 52/02; H04W 52/0212; H04W 52/028; H04W 76/28; H04W 52/0219; H04W 52/0225; H04L 5/0098;
(Continued)

(56) References Cited

U.S. PATENT DOCUMENTS

| | | | | |
|---|---|---|---|---|
| 12,323,917 B2 * | 6/2025 | Beale | ................ | H04W 52/0235 |
| 2014/0112111 A1 * | 4/2014 | Zhu | .................... | H04W 52/0264 |
| | | | | 368/250 |

(Continued)

FOREIGN PATENT DOCUMENTS

| | | | | | |
|---|---|---|---|---|---|
| CN | 109479257 A | * | 3/2019 | ............ | H04W 76/28 |
| CN | 110971474 A | * | 4/2020 | ............ | H04W 76/28 |

(Continued)

OTHER PUBLICATIONS

International Search Report and Written Opinion—PCT/US2024/012647—ISA/EPO—Jun. 4, 2024.

(Continued)

*Primary Examiner* — Wutchung Chu
(74) *Attorney, Agent, or Firm* — Holland & Hart LLP/ QUALCOMM Incorporated

(57) ABSTRACT

Methods, systems, and devices for wireless communications are described that provide a lower power sleep procedure at network entities to reduce network power consumption. Network entities may monitor for a wake-up signal (WUS) from at least one user equipment (UE) during configured WUS occasions while operating in such a lower power mode. A WUS configuration may be provided that includes at least some link maintenance WUS occasions, and a link maintenance communication may be transmitted using such a link maintenance WUS occasion if no communications are present for a threshold time period at a UE. A network entity that receives the link maintenance communications may transmit a response message, and a quality of the communications link between the UE and network entity may be confirmed, or one or more transmission parameters adjusted.

27 Claims, 22 Drawing Sheets

(58) Field of Classification Search
CPC ... H04L 5/0091; H04L 5/0053; H04L 5/0051; H04L 5/0048; H04L 5/001; Y02D 30/70
See application file for complete search history.

(56) References Cited

U.S. PATENT DOCUMENTS

| | | | | |
|---|---|---|---|---|
| 2018/0184381 | A1* | 6/2018 | Van Hamersveld | .......................... H04W 52/0216 |
| 2019/0281580 | A1* | 9/2019 | Rune | ..................... H04W 76/28 |
| 2020/0280919 | A1* | 9/2020 | Hoglund | ............... H04W 76/28 |
| 2020/0314745 | A1* | 10/2020 | Yi | ......................... H04W 72/23 |
| 2021/0022202 | A1* | 1/2021 | Kim | ...................... H04W 76/28 |
| 2021/0084586 | A1* | 3/2021 | Loehr | .............. H04W 52/0229 |
| 2021/0084590 | A1* | 3/2021 | Nam | .................. H04W 52/0216 |
| 2021/0203468 | A1* | 7/2021 | Yi | ......................... H04L 5/0098 |
| 2021/0306951 | A1* | 9/2021 | Hwang | ............. H04W 52/0219 |
| 2022/0022137 | A1* | 1/2022 | Xue | ...................... H04L 5/0091 |
| 2022/0104134 | A1* | 3/2022 | Shi | ................... H04W 52/0216 |
| 2022/0182943 | A1* | 6/2022 | Maleki | .............. H04W 52/0216 |
| 2022/0394619 | A1* | 12/2022 | Berggren | .......... H04W 52/0232 |
| 2023/0023422 | A1* | 1/2023 | Beale | ................. H04W 52/028 |
| 2023/0131118 | A1* | 4/2023 | Kim | .................. H04W 52/0216 370/311 |
| 2024/0014870 | A1* | 1/2024 | Ben Hadj Fredj | ... H04B 7/0639 |
| 2024/0196329 | A1* | 6/2024 | Bar-Or Tillinger | .......................... H04W 52/0235 |
| 2024/0373431 | A1* | 11/2024 | Marinier | .......... H04W 52/0235 |
| 2025/0056408 | A1* | 2/2025 | Xu | .................... H04W 52/0232 |
| 2025/0056414 | A1* | 2/2025 | Ma | ........................ H04W 24/10 |
| 2025/0081103 | A1* | 3/2025 | Zhou | ..................... H04W 76/27 |
| 2025/0081288 | A1* | 3/2025 | Moon | ................... H04W 76/28 |
| 2025/0088968 | A1* | 3/2025 | Mazloum | .......... H04W 52/0274 |
| 2025/0220581 | A1* | 7/2025 | Fu | ......................... H04L 5/0094 |
| 2025/0227784 | A1* | 7/2025 | Balakrishnan | ........ H04W 48/20 |

FOREIGN PATENT DOCUMENTS

| | | | | | |
|---|---|---|---|---|---|
| CN | 114287147 | A | * | 4/2022 | ............ H04W 52/02 |
| CN | 116998206 | A | * | 11/2023 | ........ H04W 52/0229 |
| JP | 2015512178 | A | * | 4/2015 | ............ H04W 72/23 |
| WO | WO-2013110372 | A1 | * | 8/2013 | ............ H04W 72/23 |
| WO | WO-2017198290 | A1 | | 11/2017 | |
| WO | WO-2019190205 | A1 | * | 10/2019 | .......... H04W 68/025 |
| WO | WO-2020222509 | A1 | * | 11/2020 | ........ H04W 52/0216 |
| WO | WO-2023081258 | A1 | * | 5/2023 | ........ H04W 52/0216 |
| WO | WO-2023247299 | A1 | * | 12/2023 | ............ H04W 24/08 |
| WO | WO-2024065723 | A1 | * | 4/2024 | ........ H04W 74/0833 |

OTHER PUBLICATIONS

Merias P (Moderator (Intel Corporation))., et al., "Discussion Summary #2 for Energy Saving Techniques of NW Energy saving SI", 3GPP TSG RAN WG1 Meeting #111, R1- 2212565, Type Discussion, FS_Netw_Energy_NR, 3rd Generation Partnership Project, Mobile Competence Centre, 650, Route Des Lucioles, F-06921 Sophia-Antipolis Cedex, France, vol. 3GPP RAN 1, No. Toulouse, FR, Nov. 14, 2022-Nov. 18, 2022, Nov. 17, 2022 , XP052223117, 137 pages, p. 35.

Moderator (Intel Corporation): "Discussion Summary #5 for Energy Saving Techniques of NW Energy Saving SI", 3GPP TSG RAN WG1 Meeting #110-bis-e, R1-2210744, 3rd Generation Partnership Project, Mobile Competence Centre, 650, Route Des Lucioles, F-06921 Sophia-Antipolis Cedex, France, vol. RAN WG1, No. e-Meeting, Oct. 10, 2022-Oct. 19, 2022, Oct. 24, 2022, XP052260207, 521 pages, pp. 12, 31, 155, 187-189, 192, 300-301, 403.

Qualcomm Incorporated: "Network Energy Saving Techniques", 3GPP TSG RAN WG1 #110bis-e, R1-2209997, 3rd Generation Partnership Project, Mobile Competence Centre, 650, Route Des Lucioles, F-06921 Sophia-Antipolis Cedex, France, vol. RAN WG1, No. e-Meeting, Oct. 10, 2022-Oct. 19, 2022, Sep. 30, 2022, XP052259468, 22 pages, the whole document.

* cited by examiner

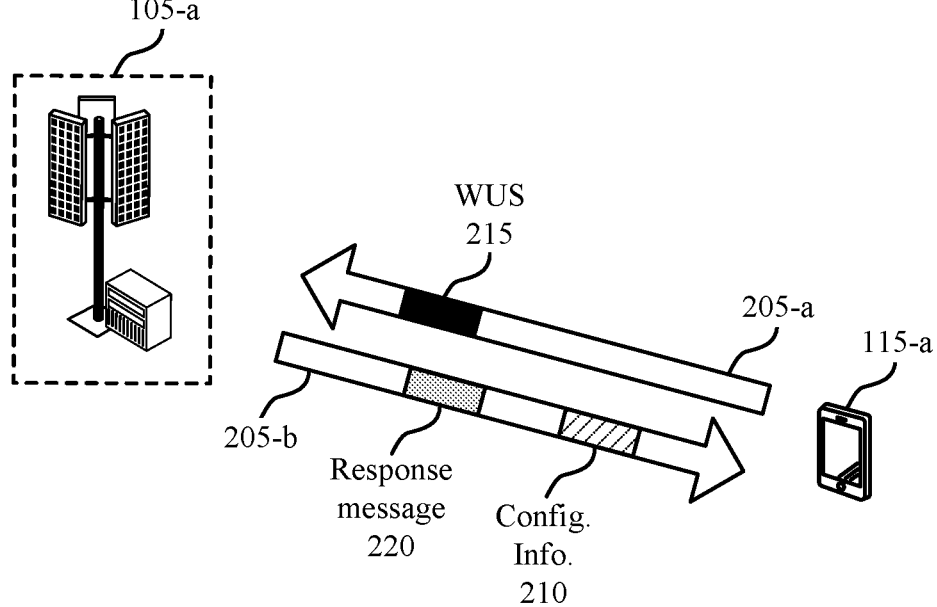
105-a
WUS
215
205-a
115-a
205-b
Response
message
220
Config.
Info.
210
200
FIG. 2

1010

1020

1015

1005

1000

130 105 115

Network
Entity

Transceiver Antenna 1310 1315

Communications
Manager

Memory

Code

1330

1320 1325

1340

Processor

1335

1305

1300

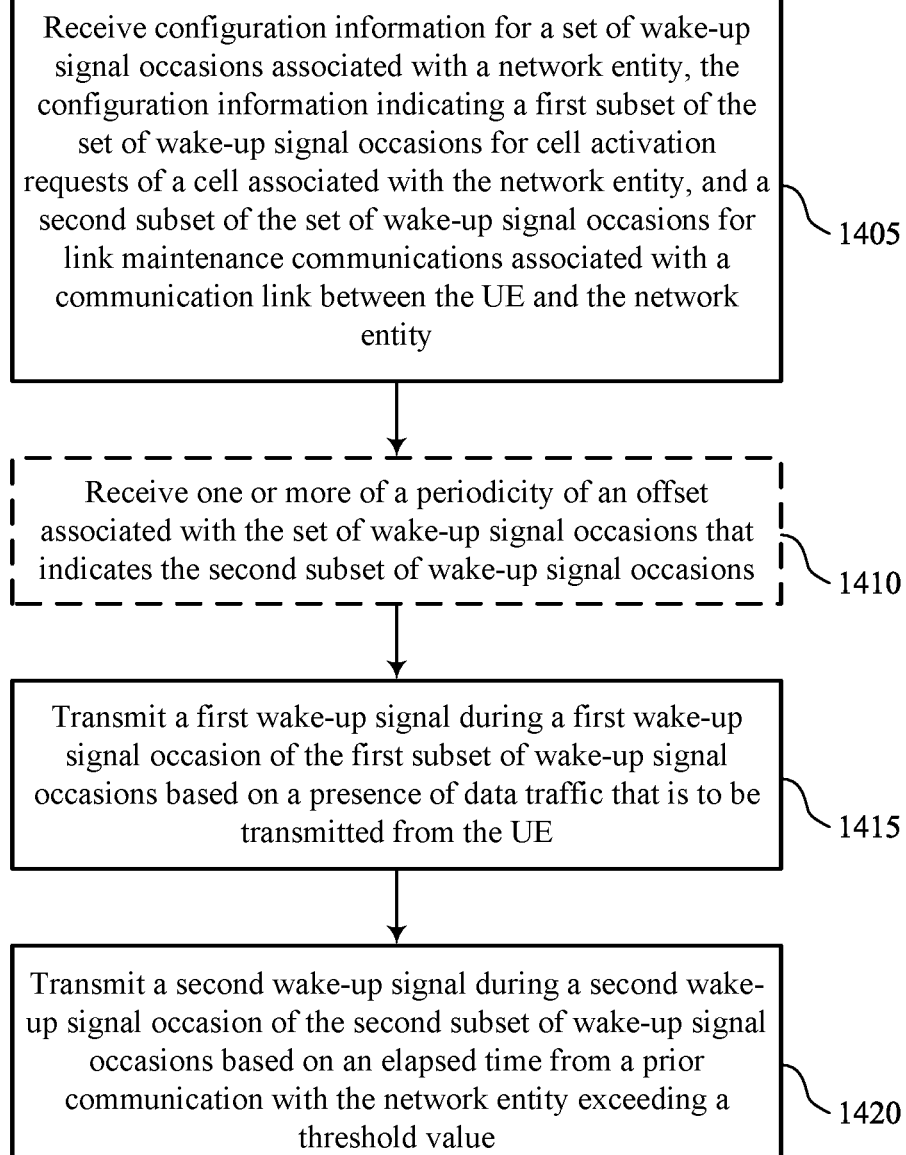

Receive configuration information for a set of wake-up signal occasions associated with a network entity, the configuration information indicating a first subset of the set of wake-up signal occasions for cell activation requests of a cell associated with the network entity, and a second subset of the set of wake-up signal occasions for link maintenance communications associated with a communication link between the UE and the network entity

1405

Receive one or more of a periodicity of an offset associated with the set of wake-up signal occasions that indicates the second subset of wake-up signal occasions

1410

Transmit a first wake-up signal during a first wake-up signal occasion of the first subset of wake-up signal occasions based on a presence of data traffic that is to be transmitted from the UE

1415

Transmit a second wake-up signal during a second wake-up signal occasion of the second subset of wake-up signal occasions based on an elapsed time from a prior communication with the network entity exceeding a threshold value

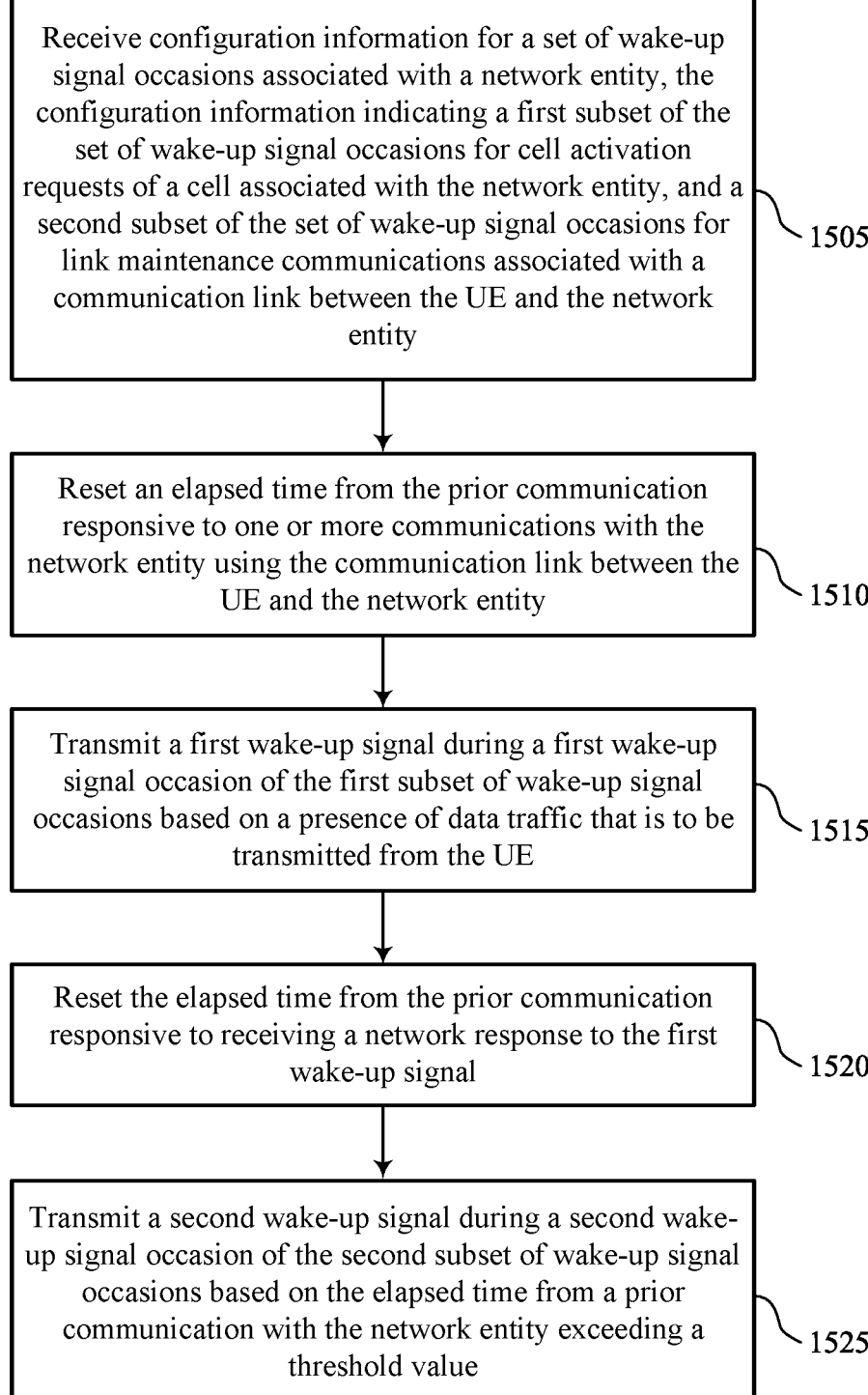

Receive configuration information for a set of wake-up signal occasions associated with a network entity, the configuration information indicating a first subset of the set of wake-up signal occasions for cell activation requests of a cell associated with the network entity, and a second subset of the set of wake-up signal occasions for link maintenance communications associated with a communication link between the UE and the network entity

1505

Reset an elapsed time from the prior communication responsive to one or more communications with the network entity using the communication link between the UE and the network entity

1510

Transmit a first wake-up signal during a first wake-up signal occasion of the first subset of wake-up signal occasions based on a presence of data traffic that is to be transmitted from the UE

1515

Reset the elapsed time from the prior communication responsive to receiving a network response to the first wake-up signal

1520

Transmit a second wake-up signal during a second wake-up signal occasion of the second subset of wake-up signal occasions based on the elapsed time from a prior communication with the network entity exceeding a threshold value

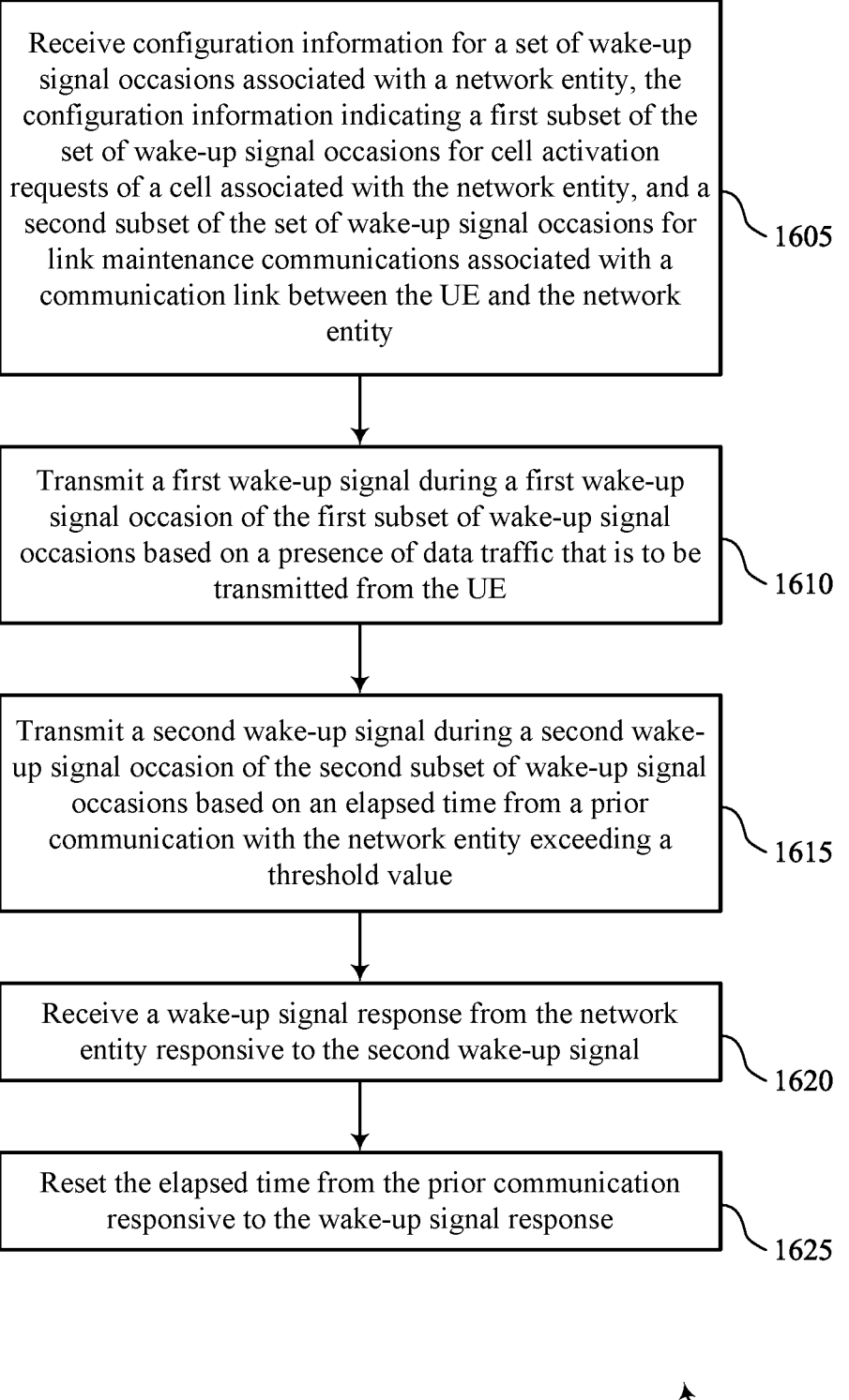

Receive configuration information for a set of wake-up signal occasions associated with a network entity, the configuration information indicating a first subset of the set of wake-up signal occasions for cell activation requests of a cell associated with the network entity, and a second subset of the set of wake-up signal occasions for link maintenance communications associated with a communication link between the UE and the network entity

1605

Transmit a first wake-up signal during a first wake-up signal occasion of the first subset of wake-up signal occasions based on a presence of data traffic that is to be transmitted from the UE

1610

Transmit a second wake-up signal during a second wake-up signal occasion of the second subset of wake-up signal occasions based on an elapsed time from a prior communication with the network entity exceeding a threshold value

1615

Receive a wake-up signal response from the network entity responsive to the second wake-up signal

1620

Reset the elapsed time from the prior communication responsive to the wake-up signal response

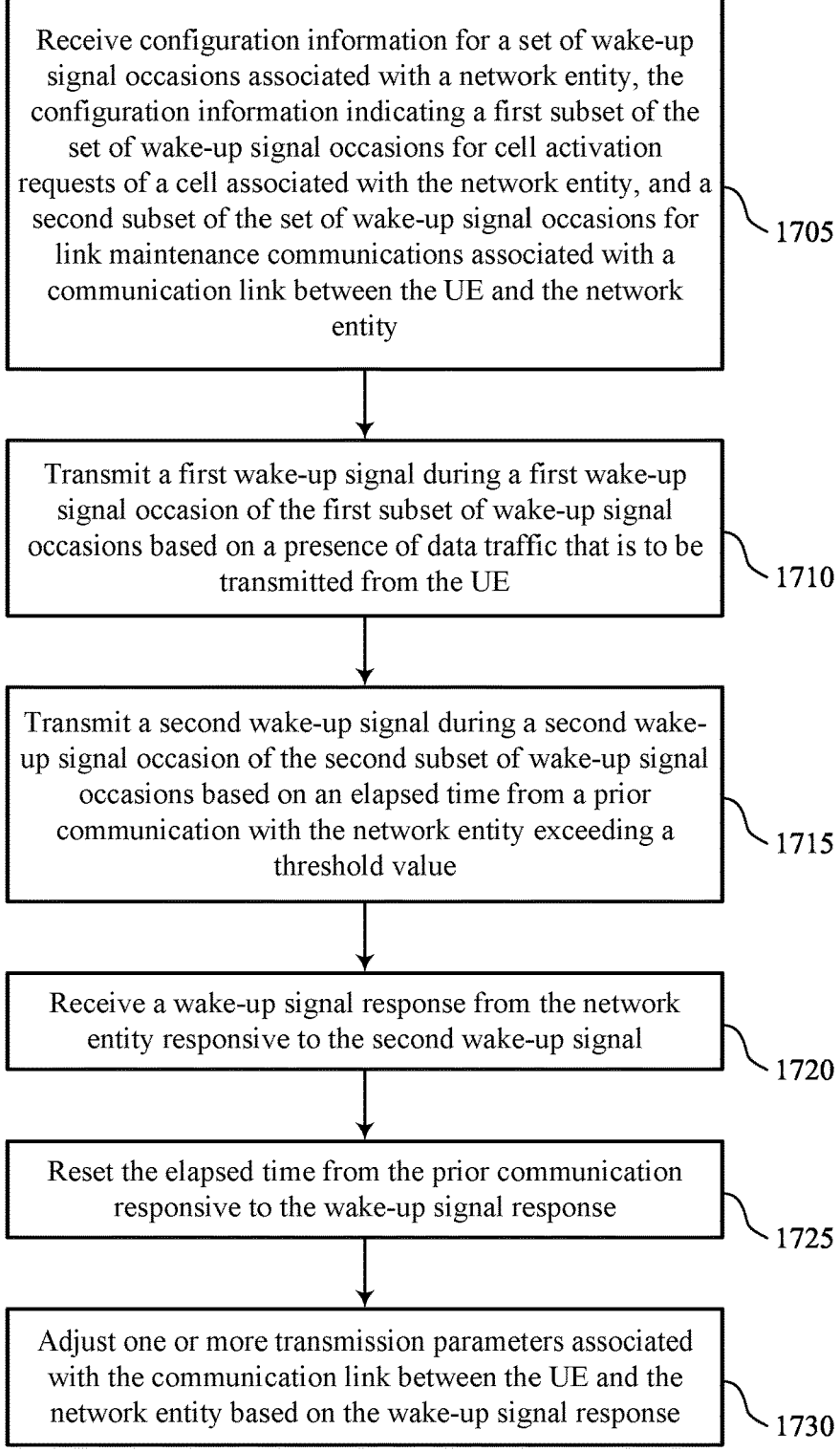

Receive configuration information for a set of wake-up signal occasions associated with a network entity, the configuration information indicating a first subset of the set of wake-up signal occasions for cell activation requests of a cell associated with the network entity, and a second subset of the set of wake-up signal occasions for link maintenance communications associated with a communication link between the UE and the network entity ⟩ 1705

Transmit a first wake-up signal during a first wake-up signal occasion of the first subset of wake-up signal occasions based on a presence of data traffic that is to be transmitted from the UE ⟩ 1710

Transmit a second wake-up signal during a second wake-up signal occasion of the second subset of wake-up signal occasions based on an elapsed time from a prior communication with the network entity exceeding a threshold value ⟩ 1715

Receive a wake-up signal response from the network entity responsive to the second wake-up signal ⟩ 1720

Reset the elapsed time from the prior communication responsive to the wake-up signal response ⟩ 1725

Adjust one or more transmission parameters associated with the communication link between the UE and the network entity based on the wake-up signal response ⟩ 1730

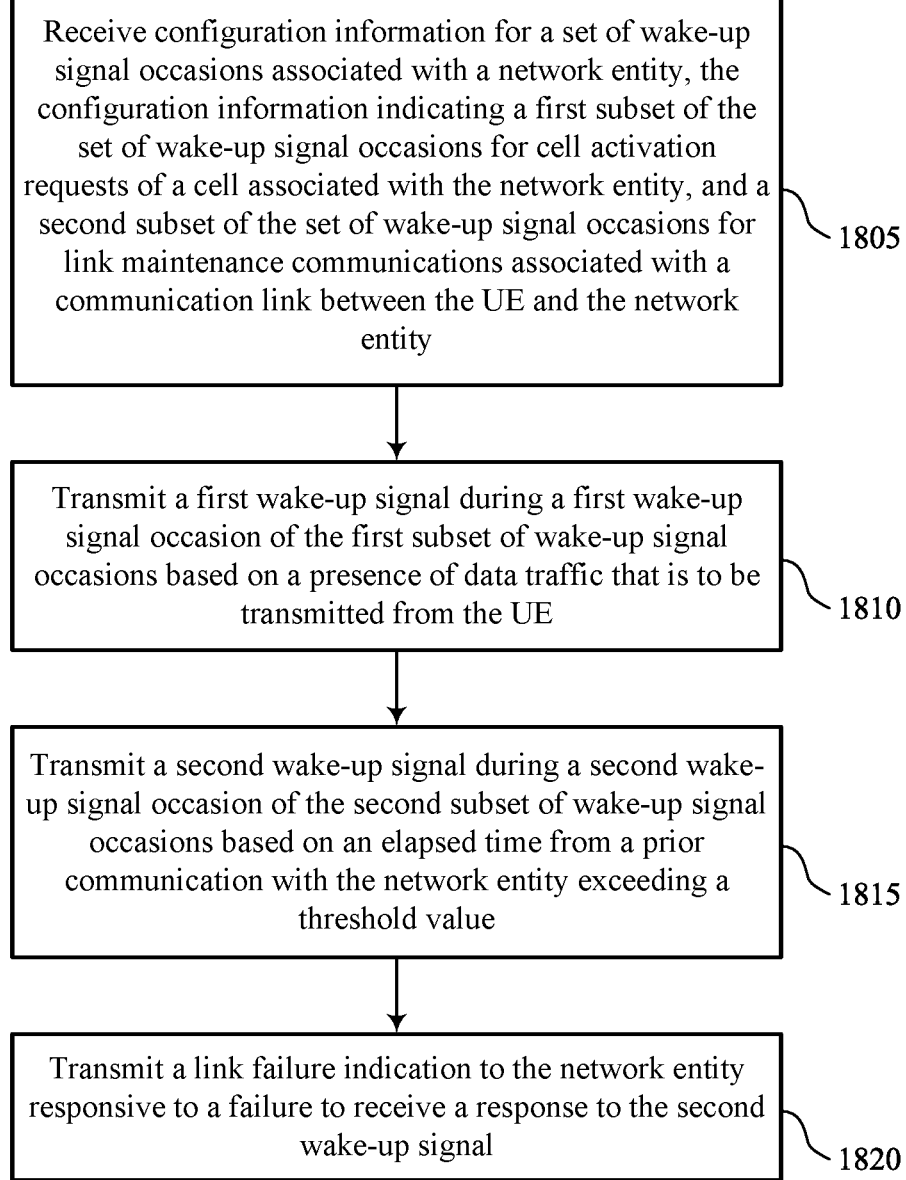

Receive configuration information for a set of wake-up signal occasions associated with a network entity, the configuration information indicating a first subset of the set of wake-up signal occasions for cell activation requests of a cell associated with the network entity, and a second subset of the set of wake-up signal occasions for link maintenance communications associated with a communication link between the UE and the network entity

1805

Transmit a first wake-up signal during a first wake-up signal occasion of the first subset of wake-up signal occasions based on a presence of data traffic that is to be transmitted from the UE

1810

Transmit a second wake-up signal during a second wake-up signal occasion of the second subset of wake-up signal occasions based on an elapsed time from a prior communication with the network entity exceeding a threshold value

1815

Transmit a link failure indication to the network entity responsive to a failure to receive a response to the second wake-up signal

Figure 19:
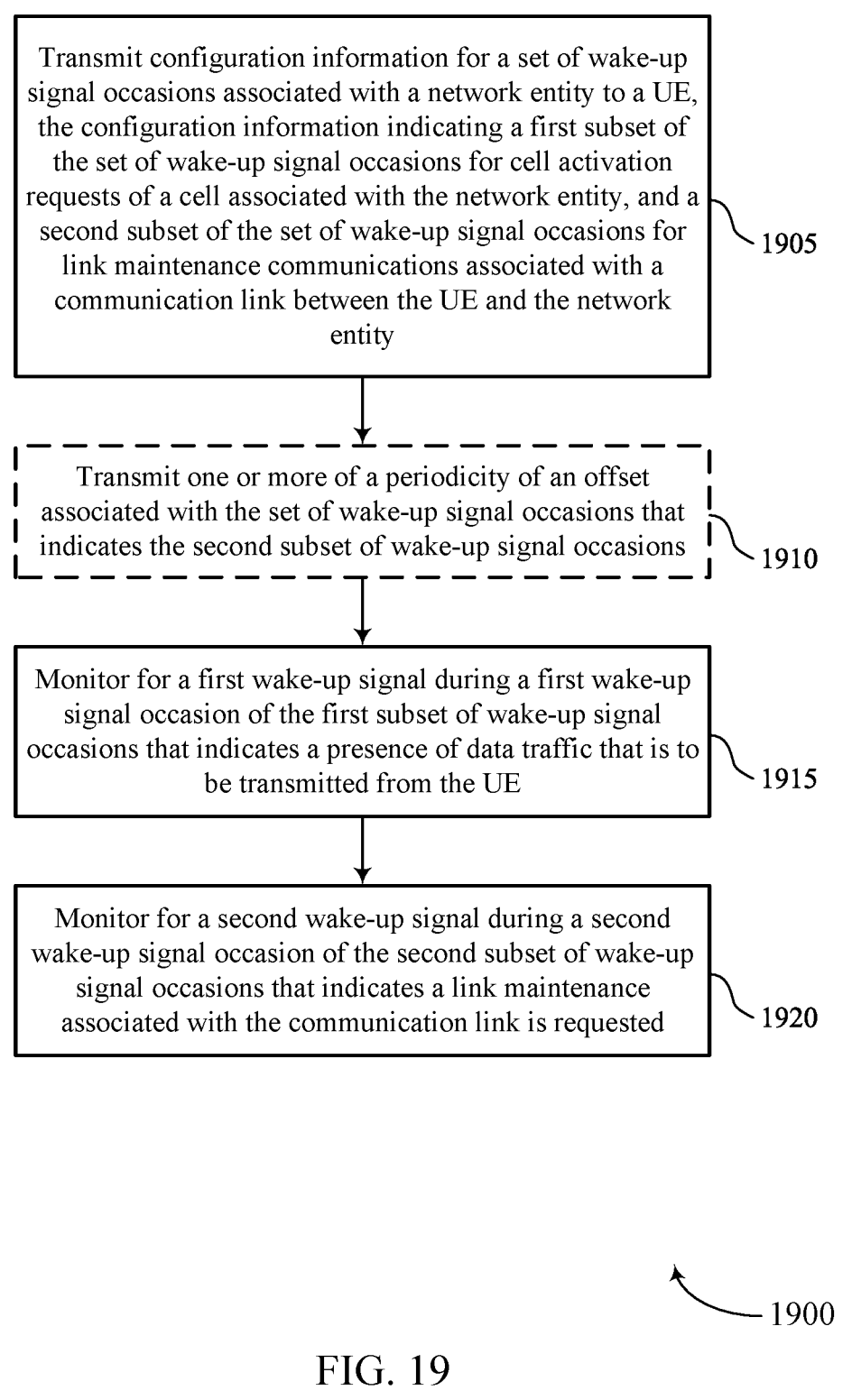

Transmit configuration information for a set of wake-up signal occasions associated with a network entity to a UE, the configuration information indicating a first subset of the set of wake-up signal occasions for cell activation requests of a cell associated with the network entity, and a second subset of the set of wake-up signal occasions for link maintenance communications associated with a communication link between the UE and the network entity

1905

Transmit one or more of a periodicity of an offset associated with the set of wake-up signal occasions that indicates the second subset of wake-up signal occasions

1910

Monitor for a first wake-up signal during a first wake-up signal occasion of the first subset of wake-up signal occasions that indicates a presence of data traffic that is to be transmitted from the UE

1915

Monitor for a second wake-up signal during a second wake-up signal occasion of the second subset of wake-up signal occasions that indicates a link maintenance associated with the communication link is requested

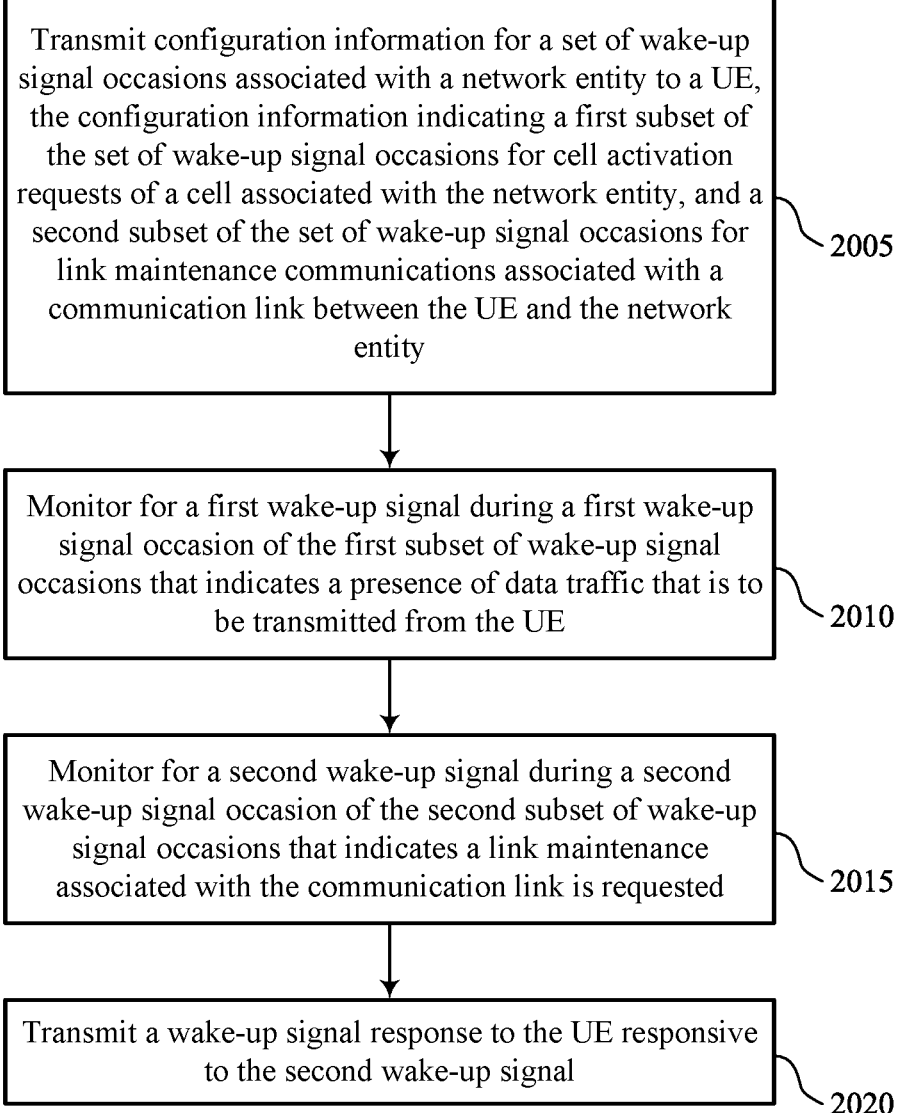

Transmit configuration information for a set of wake-up signal occasions associated with a network entity to a UE, the configuration information indicating a first subset of the set of wake-up signal occasions for cell activation requests of a cell associated with the network entity, and a second subset of the set of wake-up signal occasions for link maintenance communications associated with a communication link between the UE and the network entity
~2005

Monitor for a first wake-up signal during a first wake-up signal occasion of the first subset of wake-up signal occasions that indicates a presence of data traffic that is to be transmitted from the UE
~2010

Monitor for a second wake-up signal during a second wake-up signal occasion of the second subset of wake-up signal occasions that indicates a link maintenance associated with the communication link is requested
~2015

Transmit a wake-up signal response to the UE responsive to the second wake-up signal
~2020

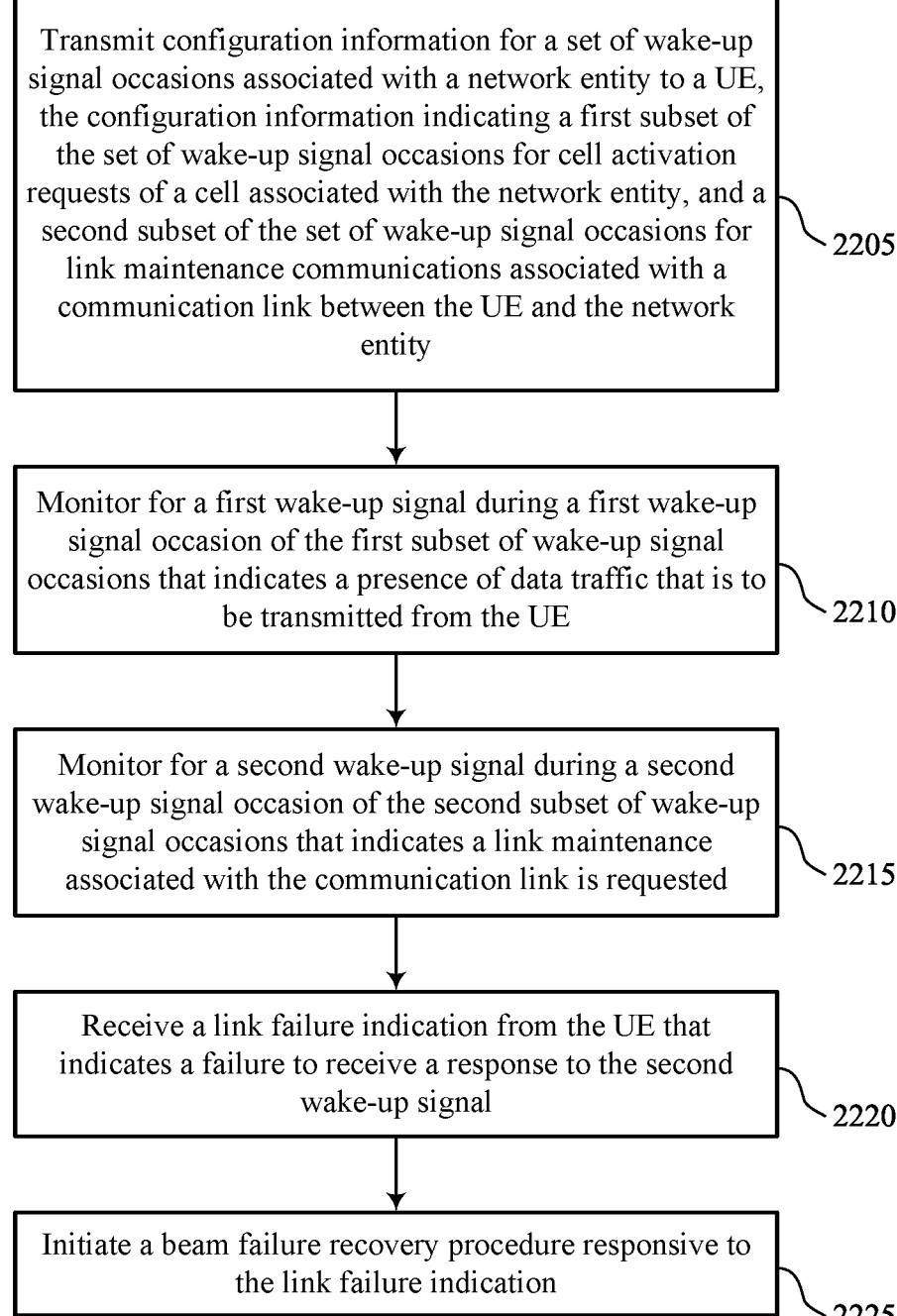

Transmit configuration information for a set of wake-up signal occasions associated with a network entity to a UE, the configuration information indicating a first subset of the set of wake-up signal occasions for cell activation requests of a cell associated with the network entity, and a second subset of the set of wake-up signal occasions for link maintenance communications associated with a communication link between the UE and the network entity

2205

Monitor for a first wake-up signal during a first wake-up signal occasion of the first subset of wake-up signal occasions that indicates a presence of data traffic that is to be transmitted from the UE

2210

Monitor for a second wake-up signal during a second wake-up signal occasion of the second subset of wake-up signal occasions that indicates a link maintenance associated with the communication link is requested

2215

Receive a link failure indication from the UE that indicates a failure to receive a response to the second wake-up signal

2220

Initiate a beam failure recovery procedure responsive to the link failure indication

TECHNIQUES FOR CONFIGURING CELL WAKE-UP SIGNAL IN WIRELESS COMMUNICATIONS

FIELD OF TECHNOLOGY

The following relates to wireless communications, including techniques for configuring cell wake-up signal in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for configuring cell wake-up signal in wireless communications. For example, the described techniques provide that a network entity may use a lower power sleep procedure to reduce power consumption, and monitor for a wake-up signal (WUS) from at least one user equipment (UE) during configured WUS occasions. In some aspects, a WUS configuration may be provided that includes at least some WUS occasions that are link maintenance WUS occasions. In some cases, if no communications are present for a threshold time period at a UE, the UE may transmit a link maintenance communication using a link maintenance WUS occasion. A network entity that receives the link maintenance communications may transmit a response message, and a quality of the communications link between the UE and network entity may be confirmed, or one or more transmission parameters adjusted. In some cases, the UE may skip transmissions in link maintenance WUS occasions if a prior communication via the link has occurred within the threshold time period. If a network response is not received from one or more link maintenance communications, the UE may declare a link failure.

A method for wireless communication at a user equipment (UE) is described. The method may include receiving configuration information for a set of wake-up signal occasions associated with a network entity, the configuration information indicating a first subset of the set of wake-up signal occasions for cell activation requests of a cell associated with the network entity, and a second subset of the set of wake-up signal occasions for link maintenance communications associated with a communication link between the UE and the network entity, transmitting a first wake-up signal during a first wake-up signal occasion of the first subset of wake-up signal occasions based on a presence of data traffic that is to be transmitted from the UE, and transmitting a second wake-up signal during a second wake-up signal occasion of the second subset of wake-up signal occasions based on an elapsed time from a prior communication with the network entity exceeding a threshold value.

An apparatus for wireless communication at a UE is described. The apparatus may include a processor, memory coupled with the processor, and instructions stored in the memory. The instructions may be executable by the processor to cause the apparatus to receive configuration information for a set of wake-up signal occasions associated with a network entity, the configuration information indicating a first subset of the set of wake-up signal occasions for cell activation requests of a cell associated with the network entity, and a second subset of the set of wake-up signal occasions for link maintenance communications associated with a communication link between the UE and the network entity, transmit a first wake-up signal during a first wake-up signal occasion of the first subset of wake-up signal occasions based on a presence of data traffic that is to be transmitted from the UE, and transmit a second wake-up signal during a second wake-up signal occasion of the second subset of wake-up signal occasions based on an elapsed time from a prior communication with the network entity exceeding a threshold value.

Another apparatus for wireless communication at a UE is described. The apparatus may include means for receiving configuration information for a set of wake-up signal occasions associated with a network entity, the configuration information indicating a first subset of the set of wake-up signal occasions for cell activation requests of a cell associated with the network entity, and a second subset of the set of wake-up signal occasions for link maintenance communications associated with a communication link between the UE and the network entity, means for transmitting a first wake-up signal during a first wake-up signal occasion of the first subset of wake-up signal occasions based on a presence of data traffic that is to be transmitted from the UE, and means for transmitting a second wake-up signal during a second wake-up signal occasion of the second subset of wake-up signal occasions based on an elapsed time from a prior communication with the network entity exceeding a threshold value.

A non-transitory computer-readable medium storing code for wireless communication at a UE is described. The code may include instructions executable by a processor to receive configuration information for a set of wake-up signal occasions associated with a network entity, the configuration information indicating a first subset of the set of wake-up signal occasions for cell activation requests of a cell associated with the network entity, and a second subset of the set of wake-up signal occasions for link maintenance communications associated with a communication link between the UE and the network entity, transmit a first wake-up signal during a first wake-up signal occasion of the first subset of wake-up signal occasions based on a presence of data traffic that is to be transmitted from the UE, and transmit a second wake-up signal during a second wake-up signal occasion of the second subset of wake-up signal occasions based on an elapsed time from a prior communication with the network entity exceeding a threshold value.

In some examples of the method, apparatuses, and non-transitory computer-readable medium described herein, the second wake-up signal indicates that link maintenance of the communication link between the UE and the network entity is requested instead of cell activation of the cell associated with the network entity. In some examples of the method, apparatuses, and non-transitory computer-readable medium described herein, the receiving the configuration information may include operations, features, means, or instructions for receiving one or more of a periodicity or an offset associated with the set of wake-up signal occasions that indicates the second subset of wake-up signal occasions.

Some examples of the method, apparatuses, and non-transitory computer-readable medium described herein may further include operations, features, means, or instructions for resetting the elapsed time from the prior communication responsive to one or more communications with the network entity using the communication link between the UE and the network entity. Some examples of the method, apparatuses, and non-transitory computer-readable medium described herein may further include operations, features, means, or instructions for resetting the elapsed time from the prior communication responsive to receiving a network response to the first wake-up signal.

Some examples of the method, apparatuses, and non-transitory computer-readable medium described herein may further include operations, features, means, or instructions for receiving a wake-up signal response from the network entity responsive to the second wake-up signal and resetting the elapsed time from the prior communication responsive to the wake-up signal response. In some examples of the method, apparatuses, and non-transitory computer-readable medium described herein, the wake-up signal response includes an identification of a source of an associated wake-up signal, and where the resetting the elapsed time is responsive to the identification corresponding to an identity of the UE.

In some examples of the method, apparatuses, and non-transitory computer-readable medium described herein, the identification of the source of the associated wake-up signal includes one or more of a random access preamble identification, an identification provided with a scheduling request, a radio network temporary identifier of the UE, or any combinations thereof. Some examples of the method, apparatuses, and non-transitory computer-readable medium described herein may further include operations, features, means, or instructions for adjusting one or more transmission parameters associated with the communication link between the UE and the network entity based on the wake-up signal response. In some examples of the method, apparatuses, and non-transitory computer-readable medium described herein, the wake-up signal response indicates one or more of a transmission power adjustment, a beam update, a transmission configuration indication (TCI) state update, a received power associated with the second wake-up signal, or any combinations thereof.

Some examples of the method, apparatuses, and non-transitory computer-readable medium described herein may further include operations, features, means, or instructions for transmitting a link failure indication to the network entity responsive to a failure to receive a response to the second wake-up signal. Some examples of the method, apparatuses, and non-transitory computer-readable medium described herein may further include operations, features, means, or instructions for transmitting one or more additional wake-up signals during one or more other wake-up signal occasions of the second subset of wake-up signal occasions responsive to a failure to receive a response to the second wake-up signal and transmitting the link failure indication to the network entity responsive to a failure to receive a response to the one or more additional wake-up signals. In some examples of the method, apparatuses, and non-transitory computer-readable medium described herein, the link failure indication may be transmitted via a different cell associated with the network entity, using a different wake-up signal occasion of a different wake-up signal configuration, using an initial access procedure, or any combinations thereof.

A method for wireless communication at a network entity is described. The method may include transmitting configuration information for a set of wake-up signal occasions associated with a network entity to a UE, the configuration information indicating a first subset of the set of wake-up signal occasions for cell activation requests of a cell associated with the network entity, and a second subset of the set of wake-up signal occasions for link maintenance communications associated with a communication link between the UE and the network entity, monitoring for a first wake-up signal during a first wake-up signal occasion of the first subset of wake-up signal occasions that indicates a presence of data traffic that is to be transmitted from the UE, and monitoring for a second wake-up signal during a second wake-up signal occasion of the second subset of wake-up signal occasions that indicates a link maintenance associated with the communication link is requested.

An apparatus for wireless communication at a network entity is described. The apparatus may include a processor, memory coupled with the processor, and instructions stored in the memory. The instructions may be executable by the processor to cause the apparatus to transmit configuration information for a set of wake-up signal occasions associated with a network entity to a UE, the configuration information indicating a first subset of the set of wake-up signal occasions for cell activation requests of a cell associated with the network entity, and a second subset of the set of wake-up signal occasions for link maintenance communications associated with a communication link between the UE and the network entity, monitor for a first wake-up signal during a first wake-up signal occasion of the first subset of wake-up signal occasions that indicates a presence of data traffic that is to be transmitted from the UE, and monitor for a second wake-up signal during a second wake-up signal occasion of the second subset of wake-up signal occasions that indicates a link maintenance associated with the communication link is requested.

Another apparatus for wireless communication at a network entity is described. The apparatus may include means for transmitting configuration information for a set of wake-up signal occasions associated with a network entity to a UE, the configuration information indicating a first subset of the set of wake-up signal occasions for cell activation requests of a cell associated with the network entity, and a second subset of the set of wake-up signal occasions for link maintenance communications associated with a communication link between the UE and the network entity, means for monitoring for a first wake-up signal during a first wake-up signal occasion of the first subset of wake-up signal occasions that indicates a presence of data traffic that is to be transmitted from the UE, and means for monitoring for a second wake-up signal during a second wake-up signal occasion of the second subset of wake-up signal occasions that indicates a link maintenance associated with the communication link is requested.

A non-transitory computer-readable medium storing code for wireless communication at a network entity is described. The code may include instructions executable by a processor to transmit configuration information for a set of wake-up signal occasions associated with a network entity to a UE, the configuration information indicating a first subset of the set of wake-up signal occasions for cell activation requests of a cell associated with the network entity, and a second subset of the set of wake-up signal occasions for link maintenance communications associated with a communication link between the UE and the network entity, monitor for a first wake-up signal during a first wake-up signal occasion of the first subset of wake-up signal occasions that indicates a presence of data traffic that is to be transmitted from the UE, and monitor for a second wake-up signal during a second wake-up signal occasion of the second subset of wake-up signal occasions that indicates a link maintenance associated with the communication link is requested.

In some examples of the method, apparatuses, and non-transitory computer-readable medium described herein, the second wake-up signal indicates that link maintenance of the communication link between the UE and the network entity is requested instead of cell activation of the cell associated with the network entity. In some examples of the method, apparatuses, and non-transitory computer-readable medium described herein, the transmitting the configuration information may include operations, features, means, or instructions for transmitting one or more of a periodicity or an offset associated with the set of wake-up signal occasions that indicates the second subset of wake-up signal occasions.

In some examples of the method, apparatuses, and non-transitory computer-readable medium described herein, the transmitting the configuration information may include operations, features, means, or instructions for transmitting an indication of a time threshold value associated with the second subset of wake-up signal occasions, where a wake-up signal is to be transmitted in the second subset of wake-up signal occasions responsive to an elapsed time from a prior communication via the communication link exceeding the time threshold value.

Some examples of the method, apparatuses, and non-transitory computer-readable medium described herein may further include operations, features, means, or instructions for transmitting a wake-up signal response to the UE responsive to the second wake-up signal. In some examples of the method, apparatuses, and non-transitory computer-readable medium described herein, the wake-up signal response includes an identification of a source of the second wake-up signal. In some examples of the method, apparatuses, and non-transitory computer-readable medium described herein, the identification of the source of the second wake-up signal includes one or more of a random access preamble identification, an identification provided with a scheduling request, a radio network temporary identifier of the UE, or any combinations thereof.

Some examples of the method, apparatuses, and non-transitory computer-readable medium described herein may further include operations, features, means, or instructions for adjusting one or more transmission parameters associated with the communication link between the UE and the network entity based on the second wake-up signal. In some examples of the method, apparatuses, and non-transitory computer-readable medium described herein, the wake-up signal response indicates one or more of a transmission power adjustment, a beam update, a TCI state update, a received power associated with the second wake-up signal, or any combinations thereof.

Some examples of the method, apparatuses, and non-transitory computer-readable medium described herein may further include operations, features, means, or instructions for receiving a link failure indication from the UE that indicates a failure to receive a response to the second wake-up signal and initiating a beam failure recovery procedure responsive to the link failure indication. In some examples of the method, apparatuses, and non-transitory computer-readable medium described herein, the link failure indication may be received via a different cell associated with the network entity, via a different wake-up signal occasion of a different wake-up signal configuration, via an initial access procedure, or any combinations thereof.

BRIEF DESCRIPTION OF THE DRAWINGS

FIG. 2 illustrates an example of a wireless communications system that supports techniques for configuring cell wake-up signal in wireless communications in accordance with one or more aspects of the present disclosure.

FIGS. 14 through 22 illustrate flowcharts showing methods that support techniques for configuring cell wake-up signal in wireless communications in accordance with one or more aspects of the present disclosure.

DETAILED DESCRIPTION

Figure 1:
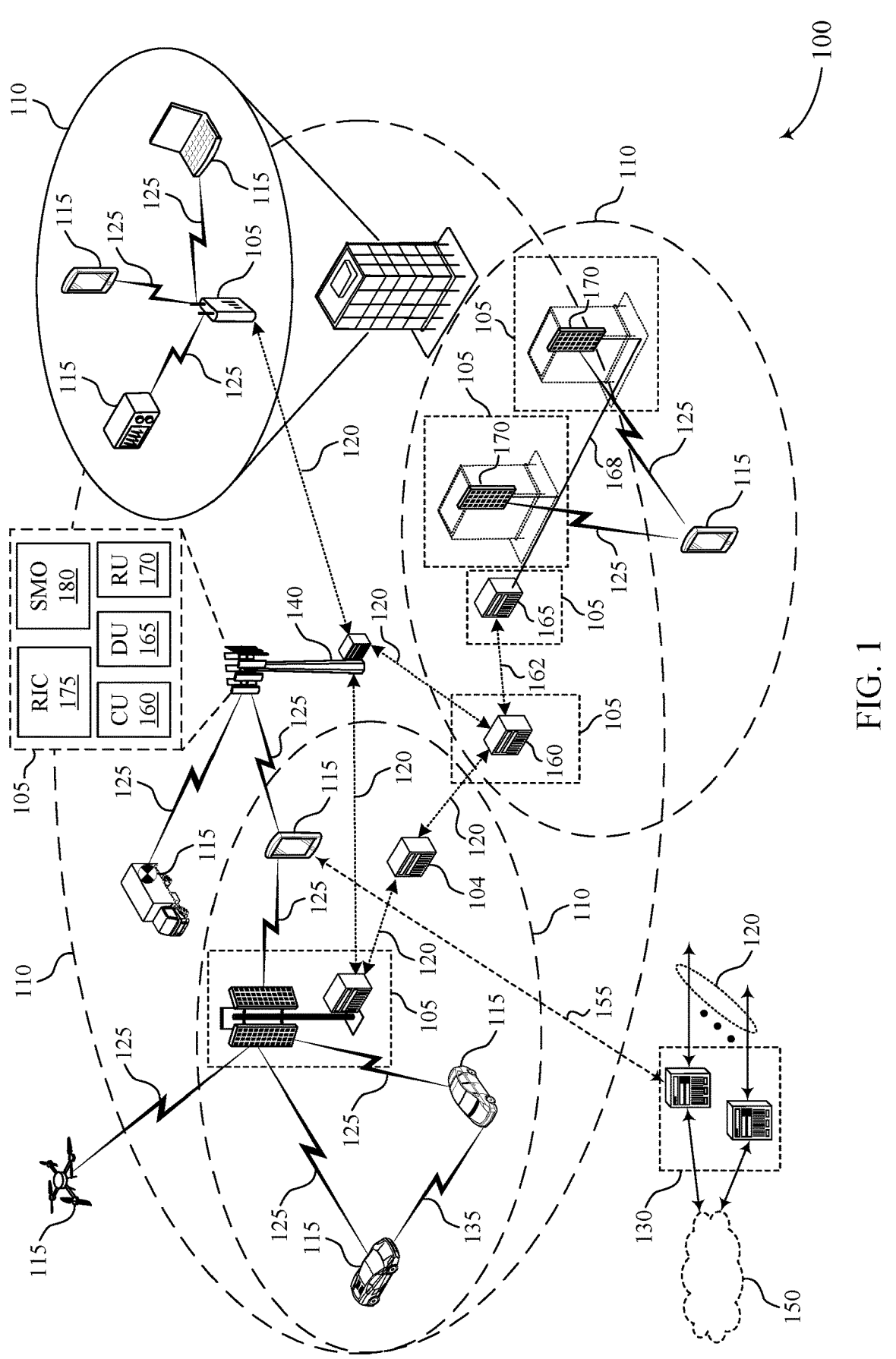
FIG. 1 illustrates an example of a wireless communications system that supports techniques for configuring cell wake-up signal in wireless communications in accordance with one or more aspects of the present disclosure.

A wireless communications system may include a device, such as a user equipment (UE) or a network entity (e.g., an eNodeB (eNB), a next-generation NodeB or a giga-NodeB, either of which may be referred to as a gNB, or some other base station or network entity), that supports wireless communications using one or multiple radio access technologies. Examples of radio access technologies include 4G systems, such as LTE systems, 5G systems, which may be referred to as NR systems, or other systems and radio technologies, including future systems and radio technologies not explicitly mentioned herein (e.g., sixth generation (6G) systems and beyond).

In some wireless communications systems, such as fifth generation (5G) systems, a relatively large amount of power may be consumed by network components in some situations. For example, a network entity in a system that uses beamformed communications, such as a radio unit (RU) or a radio head, may transmit multiple directional beams in multiple directions. Such systems may provide information for use by a UE to access the wireless communications system (e.g., system information that provides parameters for system access) using beam sweeping techniques in which information is provided in multiple different transmissions in multiple different directions. For example, multiple instances of synchronization signal blocks (SSBs) and system information (SI) transmissions (e.g., remaining minimum system information (RMSI) transmissions) may be transmitted across multiple beams in multiple different directions according to a beam sweeping procedure. Such beam sweeping techniques may consume additional power relative to techniques that do not use beam sweeping (e.g., information provided in a single omni-directional transmission may consume less power than transmission of multiple instances of the information in multiple different directions). Further, such beam sweeping transmissions may be transmitted on multiple different cells, such as a primary cell (PCell) and one or more secondary cells (SCells).

In some cases, in order to reduce network power consumption, a network entity may transition to a sleep mode or idle mode in which transmit and receive circuitry is powered down. For example, during off-peak times, there may be no traffic or a light traffic load in a cell, and the network entity may stop or reduce periodic transmissions (e.g., SSB and SI transmissions) and periodic monitoring (e.g., monitoring for random access requests or small data transmission (SDT) communications), and transition to the sleep mode in which periodic active periods are used to monitor for a wake-up signal (WUS) from a served device such as a UE. If the network entity does not detect a WUS, it transitions back to the sleep mode. If one or more WUS is detected, the network entity may maintain an active mode or initiate an active mode in addition to periods during which WUSs are monitored. In some cases, such sleep mode operations may be implemented on one or more SCells, which may have less control communications than a PCell and thus are more likely to have periods with light or no traffic, although such techniques may also be used in PCells in some conditions. In some cases, a UE may be configured with a periodicity at which WUSs may be transmitted in accordance with periods during which a cell will monitor for WUSs, which may be referred to as WUS occasions. If data traffic is present in the UE transmit buffer, the UE may transmit a WUS during a WUS occasion to trigger the cell to start or maintain an active state to allow for communications of the UE's data traffic.

In some cases, when operating according to a WUS configuration, relatively long durations of time between communications via a link between the UE and network entity may occur (e.g., in cases where a UE does not have data traffic for a relatively long duration of time). In such time periods in which a link is unused, channel conditions may change, potentially to the point where the link does not support communications. Such situations may result in increased latency because a UE may retry a WUS transmission in one or more WUS occasions and then declare a link failure.

In accordance with various aspects discussed herein, techniques are provided in which a WUS configuration may include WUS occasions for cell activation (e.g., a first subset of a set of WUS occasions) and WUS occasions for link maintenance (e.g., a second subset of the set of WUS occasions). When operating according to such a configuration, if no communications are present for a threshold time period, a UE may transmit a link maintenance communication using a link maintenance WUS occasion. In some cases, the UE may skip transmissions in link maintenance WUS occasions if a prior communication via the link has occurred within the threshold time period. A network entity, in response to receipt of a link maintenance WUS transmission, may confirm receipt using an ID associated with the UE. In some cases, the network entity also may provide information for link adaptation, such as power adjustments, beam updates, transmission configuration indication (TCI) state updates, a reference signal received power (RSRP) of the received WUS, or any combinations thereof. Additionally, or alternatively, if a network response is not received at the UE from a link maintenance WUS, the UE may declare a link failure (e.g., following one or more WUS transmissions with no network response). In some cases, if a network response is not received after one or more retries, the UE may declare link failure via a different cell, via a different WUS configuration, or through an initial access procedure.

Various techniques as discussed herein may provide one or more UE and network enhancements and efficiencies. For example, a network entity may transition to a sleep mode and network power savings may be achieved, and link maintenance may be performed based on one or more link maintenance WUSs from one or more UEs. Such techniques may provide for enhanced reliability of communications links for WUS communications, and also provide reduced latency due to fewer instances where WUS communications are retried or link failures declared. Further, information conveyed by a link maintenance WUS and associated response may allow for adjustment of transmission parameters associated with the communications link, which may further enhance reliability and reduce latency, thus enhancing system efficiency and providing an enhanced user experience.

Aspects of the disclosure are initially described in the context of wireless communications systems. Aspects of the disclosure are further illustrated by and described with reference to wake-up signal timings and occasions, process flows, apparatus diagrams, system diagrams, and flowcharts that relate to techniques for configuring cell wake-up signal in wireless communications.

FIG. 1 illustrates an example of a wireless communications system 100 that supports techniques for configuring cell wake-up signal in wireless communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for configuring cell wake-up signal in wireless communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots.

Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications.

The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHZ, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some cases, in order to reduce network power consumption, a network entity 105 may transition to a sleep mode or idle mode in which transmit and receive circuitry is powered down. Such network entities 105 may use periodic active periods to monitor for a WUS from a served device such as a UE 115. If the network entity 105 does not detect a WUS, it may transition back to the sleep mode. If one or more WUS is detected the network entity 105 may maintain an active mode, or initiate an active mode in addition to periods during which WUSs are monitored. In some cases, such sleep mode operations may be implemented on one or more cells that are served by the network entity 105. In some cases, a UE 115 may be configured with a periodicity at which WUSs may be transmitted in accordance with periods during which a cell will monitor for WUSs, which may be referred to as WUS occasions. If data traffic is present in the UE 115 transmit buffer, the UE 115 may transmit a WUS during a WUS occasion to trigger the cell to start or maintain an active state to allow for communications of the UE 115 data traffic.

In accordance with various aspects discussed herein, a WUS configuration may be provided that includes at least some WUS occasions that are link maintenance WUS occasions. In some cases, if no communications are present for a threshold time period at a UE 115, the UE 115 may transmit a link maintenance communication using a link maintenance WUS occasion. A network entity 105 that receives the link maintenance communications may transmit a response message, and a quality of the communications link between the UE 115 and network entity 105 may be confirmed, and/or one or more transmission parameters adjusted. In some cases, the UE 115 may skip transmissions in link maintenance WUS occasions if a prior communication via the link has occurred within the threshold time period. If a network response is not received from one or more link maintenance communications, the UE 115 may declare a link failure.

FIG. 2 illustrates an example of a wireless communications system 200 that supports techniques for configuring cell wake-up signal in wireless communications in accordance with one or more aspects of the present disclosure. The wireless communications system 200 may implement or be implemented by aspects of the wireless communications system 100. For example, the wireless communications system 200 may include a network entity 105-a and a UE 115-a, which may be examples of a network entity 105 (e.g., an RU 170, a DU 165, a CU 160, a base station 140, or some combination thereof) and a UE 115 as described with reference to FIG. 1. The network entity 105-a and the UE 115-a may communicate with one another via an uplink channel 205-a and a downlink channel 205-b, which may be examples or components of a communication link 125 as described with reference to FIG. 1. The UE 115-a and network entity 105-a may support techniques for WUS transmissions that provide for link maintenance. By providing link maintenance techniques, the UE 115-a and network entity 105-a may reduce instances where WUSs need to be retried or link failures declared, which may promote resource efficiency, reduced latency, and enhanced reliability, while also providing for reduced power consumption for the wireless communications system 200.

In the example of FIG. 2, the network entity 105-a may transmit configuration information 210 to the UE 115-a. In some cases, the configuration information 210 may include information related to cell sleep and active mode periods and WUS occasions. The network entity 105-a may initiate a sleep procedure at a cell (e.g., a SCell or PCell that is configured at the UE 115-a) based on the configuration information 210. In the event that the UE 115-a has traffic in a transmit buffer, the UE 115-a may transmit a WUS 215 during a WUS occasion based on the configuration information 210. The network entity 105-a may detect the WUS 215, and transmit a response message 220 to the UE 115-a.

In accordance with various aspects discussed herein, the configuration information 210 may provide for a set of WUS occasions, in which a first subset of the set of WUS occasions may be configured for cell activation requests, and a second subset of the set of WUS occasions may be configured for link maintenance. In some cases, the UE 115-a may initiate a timer subsequent to a successful communication with the network entity 105-a (e.g., via a communications link associated with the uplink channel 205-a and the downlink channel 205-b). If no communications are present for a threshold time period after initiating the timer (e.g., due to a lack of data in a transmit buffer for communication between the UE 115-a and network entity 105-a), the UE 115-a may transmit a link maintenance communication using a link maintenance WUS occasion. If one or more communications via the communications link occur prior to the expiration of the threshold time period, the UE 115-a may skip transmissions in link maintenance WUS occasions, and reset the timer accordingly. In some cases, the network entity 105-a, in response to receipt of a link maintenance WUS transmission, may confirm receipt using an ID associated with the UE 115-a. In some cases, the network entity 105-a also may provide information for link adaptation, such as power adjustments, beam updates, TCI state updates, a RSRP of the received WUS, or any combinations thereof. Additionally, or alternatively, if a network response is not received at the UE 115-a from a link maintenance WUS, the UE may declare a link failure. Examples of WUS occasions and associated timing are discussed for several examples with reference to FIGS. 3, 4A, and 4B.

Figure 3:
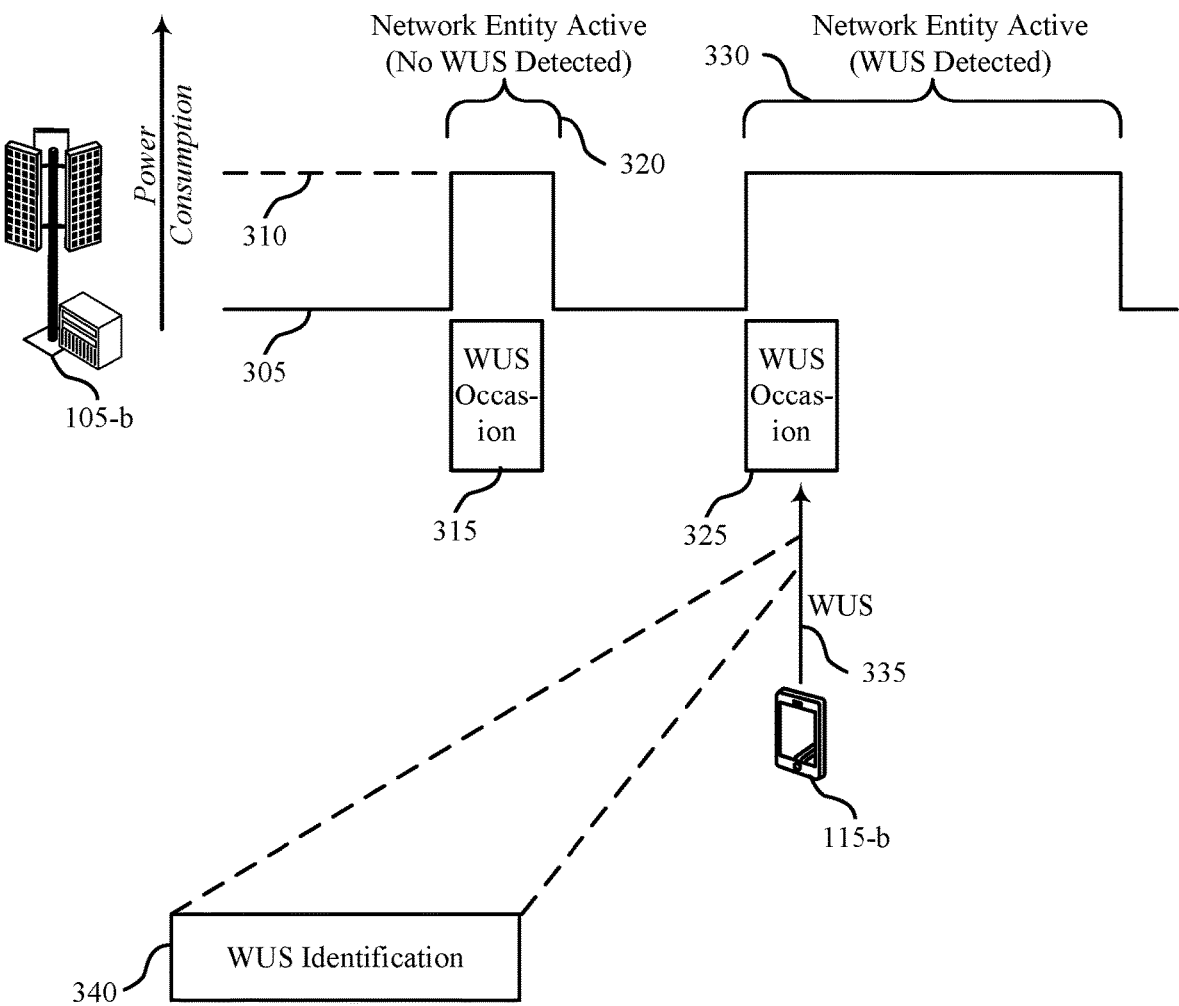
FIG. 3 illustrates an example of a wake-up signal timing that supports techniques for configuring cell wake-up signal in wireless communications in accordance with one or more aspects of the present disclosure.

FIG. 3 illustrates an example of a wake-up signal timing 300 that supports techniques for configuring cell wake-up signal in wireless communications in accordance with one or more aspects of the present disclosure. The WUS timing 300 may be implemented by aspects of the wireless communications system 100 or 200. For example, a UE 115-b and network entity 105-b, which may be examples of UEs 115 and network entities 105 of FIGS. 1 and 2, may implement the WUS timing 300. As discussed herein, network entity 105-b may transition between a sleep mode 305 and an active mode 310, where the sleep mode 305 has lower power consumption than the active mode. A WUS configuration may be provided that may trigger the network entity 105-b to remain in the active mode 310 for communications, thus allowing for reduced network power consumption and efficient wake-up procedures, which may enhance overall network efficiency and user experience.

In the example of FIG. 3, the network entity 105-b enters sleep mode 305 that provides network power saving, in which periodic active modes 310 may be used to monitor for WUSs and maintain network operation. In some cases, a sleep procedure may be enabled at the network entity 105-b based on traffic loads that are being served. For example, during certain hours (e.g., night hours in office areas) there may be relatively light traffic or no traffic for a cell, and the sleep procedure may help save network power and operational cost. In some cases, different sleep modes may be configured, where some sleep modes will turn off RF chains at the network entity 105-b while others may not, and thus different sleep modes have different power consumption and may have different transition times. In the example of FIG. 3, the network entity 105-b may configure periodic occasions for monitoring for a WUS 335, which include a first WUS occasion 315 and a second WUS occasion 325 in this example. In this example, during active period 320 associated with the first WUS occasion 315, the network entity 105-b may not detect a WUS and may transition back to sleep mode 305. During active period 330 associated with second WUS occasion 325, the network entity 105-b may detect WUS 335 from the UE 115-b, and may maintain the active mode 310 beyond the duration of the second WUS occasion 325 in order to provide communications with the UE 115-b. In accordance with various aspects discussed herein, a WUS identification 340 from the UE 115-b may be provided for link maintenance (e.g., using a WUS occasion that is configured as a link maintenance WUS occasion, or using WUS identification associated with a link maintenance communication).

In some cases, the WUS 335 may have different forms such as a RACH preamble or PUCCH transmission. In the example of FIG. 3, the WUS 335 may be a RACH request that includes a RACH preamble. In some cases, the RACH preamble may be selected from a set of RACH preambles used for identification of the UE 115-b. Additionally, or alternatively, the RACH preamble may be selected from a subset of available RACH preambles that are configured for indication of a link maintenance WUS, and the network entity 105-b may determine that the WUS 335 is a link maintenance WUS based on the RACH preamble and the UE 115-b is not seeking cell activation for data communications. In other cases, the WUS 335 may be a physical uplink control channel (PUCCH) transmission, such as a scheduling request (SR) transmission, and may include a payload that indicates that the WUS 335 is for link maintenance. In further cases, a set of WUS occasions may be configured, in which a subset of WUS occasions are for link maintenance transmissions. In such cases, the network entity 105-b may receive the WUS 335 in a link maintenance WUS occasion and identify that the UE 115-b does not seek cell activation for data communications, but instead is to perform link maintenance.

Figures 4A, 4B:
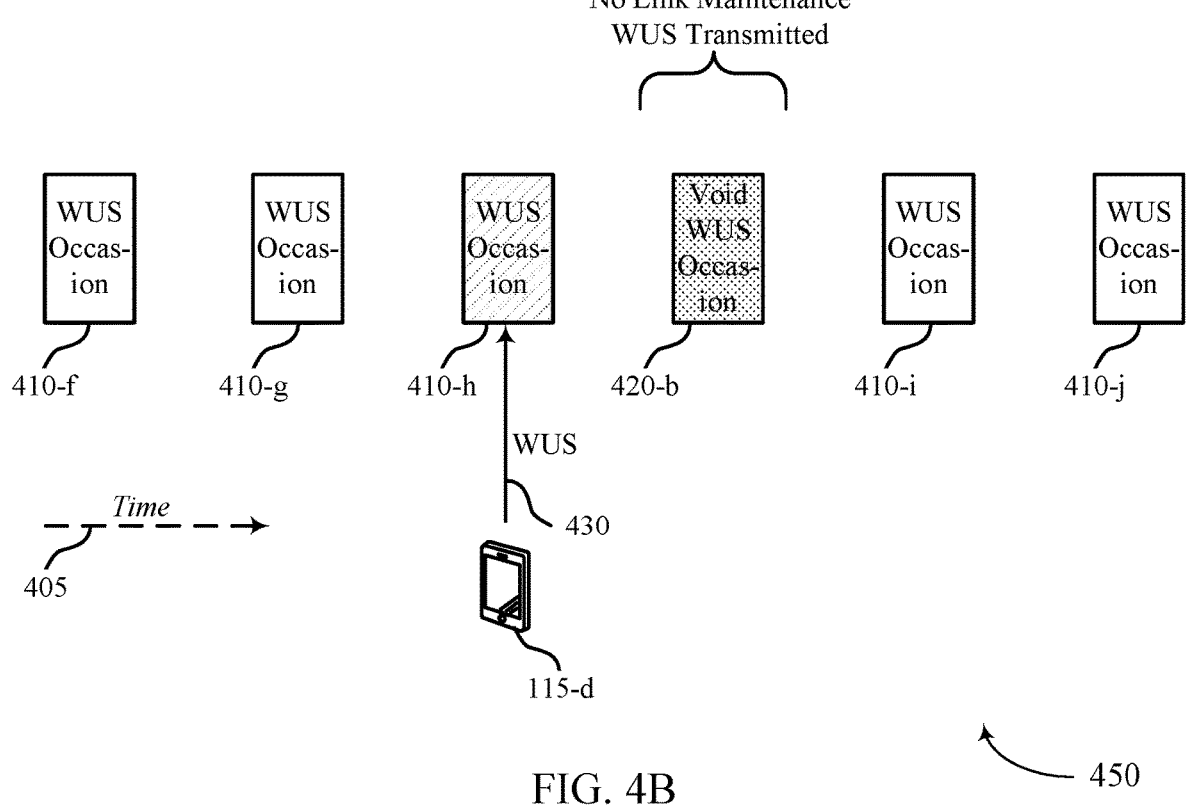
FIGS. 4A and 4B illustrate examples of wake-up signal occasions for link maintenance that supports techniques for configuring cell wake-up signal in wireless communications in accordance with one or more aspects of the present disclosure.

FIGS. 4A and 4B illustrate examples of WUS occasions 400 and 450 that support techniques for configuring cell wake-up signal in wireless communications in accordance with one or more aspects of the present disclosure. The WUS occasions 400 and 450 may be implemented by aspects of the wireless communications system 100 or 200. For example, a UEs and network entities, which may be examples of UEs and network entities of FIGS. 1 and 2, may implement the WUS occasions 400 and 450. As discussed herein, network entities may transition between a sleep mode and an active mode, where the sleep mode has lower power consumption than the active mode. A WUS configuration may be provided that may trigger the network entity to remain in the active mode for communications, thus allowing for reduced network power consumption and efficient wake-up procedures, which may enhance overall network efficiency and user experience.

In the example of FIG. 4A, a network entity may configure a set of WUS occasions 400 (e.g., periodic occasions in time 405), which include a first subset of WUS occasions

410 that are configured for cell activation signaling, and a second subset of WUS occasions 420 that are configured for link maintenance. The network entity may enter a sleep mode that provides network power saving, and the WUS configuration may provide periods in which periodic active modes may be used to monitor for wake-up signals and maintain network operation, similarly as discussed with reference to FIG. 3. In this example, the network entity may configure the first subset of WUS occasions 410 for monitoring for link activation WUSs, which include WUS occasions 410-*a* through 410-*e*. In this example, a link maintenance WUS occasion 420-*a*, which may be referred to as a void WUS occasion, is configured to provide an indication of link maintenance. In the example of FIG. 4A, the UE 115-*c* may have no link activity for a configured time duration 415, and may transmit link maintenance WUS 425 in the link maintenance WUS occasion 420-*a*. In some cases, the time frame of the second subset of WUS occasions 420 may be defined with a periodicity and offset within the configured set of WUS occasions for a cell.

As discussed herein, the transmission of a "void" cell WUS in link maintenance WUS occasion 420-*a* may be conditional on how long the UE 115-*c* has not transmitted any cell WUS signal with a corresponding network response. For example, if other communications occur within the configured time duration 415, the UE 115-*c* may reset a timer associated with the link maintenance WUS 425. FIG. 4B illustrates an example of a set of WUS occasions 450 in which a UE 115-*d* may skip a link maintenance communication in a WUS occasion 420-*b* of the second subset of WUS occasions 420. In this example, the first subset of WUS occasions 410-*f* through 410-*j* may include a link activation WUS occasion 410-*h* in which the UE 115-*d* transmits a WUS communication 430. For example, the UE 115-*d* may transmit a cell WUS signal requesting the network to send SSB and SIB1, and an associated response is received from the network. In such cases, the UE 115-*d* may skip the "void" cell WUS occasion 420-*b* if it falls within the configured time duration. For example, the configured time duration may be provided with the WUS configuration, and may be a specific time defined by a timer, a quantity of symbols, a quantity of slots, a quantity of frames, or any other period that may be configured at the UE 115-*d*.

With further reference to FIG. 4A, in some cases, in response to the link maintenance WUS 425, the network entity may a network response. For example, the network response may include a confirmation of the identity of the UE 115-*c* transmitting the link maintenance WUS 425 (e.g., a random access preamble ID (RAPID), or ID provided with a SR). Additionally, or alternatively, in some cases the network response may provide a dynamic adaptation of the cell WUS transmission parameters, such as a power adjustment (e.g., a power delta value) for a configured transmission power (e.g., a negative, positive, or zero adjustment), a beam or TCI state update, a RSRP of the received power at the network due to the transmission of the cell WUS (e.g., to allow the UE 115-*d* to monitor the link quality of the cell WUS), or any combinations thereof.

In some cases, if the UE 115-*c* does not receive a network response for a link maintenance WUS 425, a link failure may be assumed. In some cases, one or more retries may be performed, and if the UE 115-*c* does not receive a network response for N consecutive occasions, the UE 115-*c* assumes that there is a link failure (e.g., the parameter N may be RRC configured to be one or more occasions, which may be provided with WUS configuration information). In some cases, a link failure may be declared at the UE 115-*c*, and the UE 115-*c* may send an indication to the network via a primary cell if it is active, using a different WUS configuration, or attempt initial access to the network. For example, the UE 115-*c* may be configured with a backup behavior such as a second WUS configuration that is different than the WUS configuration associated with WUS occasions 400, such as having different time and frequency resources and/or transmission power.

Figure 5:
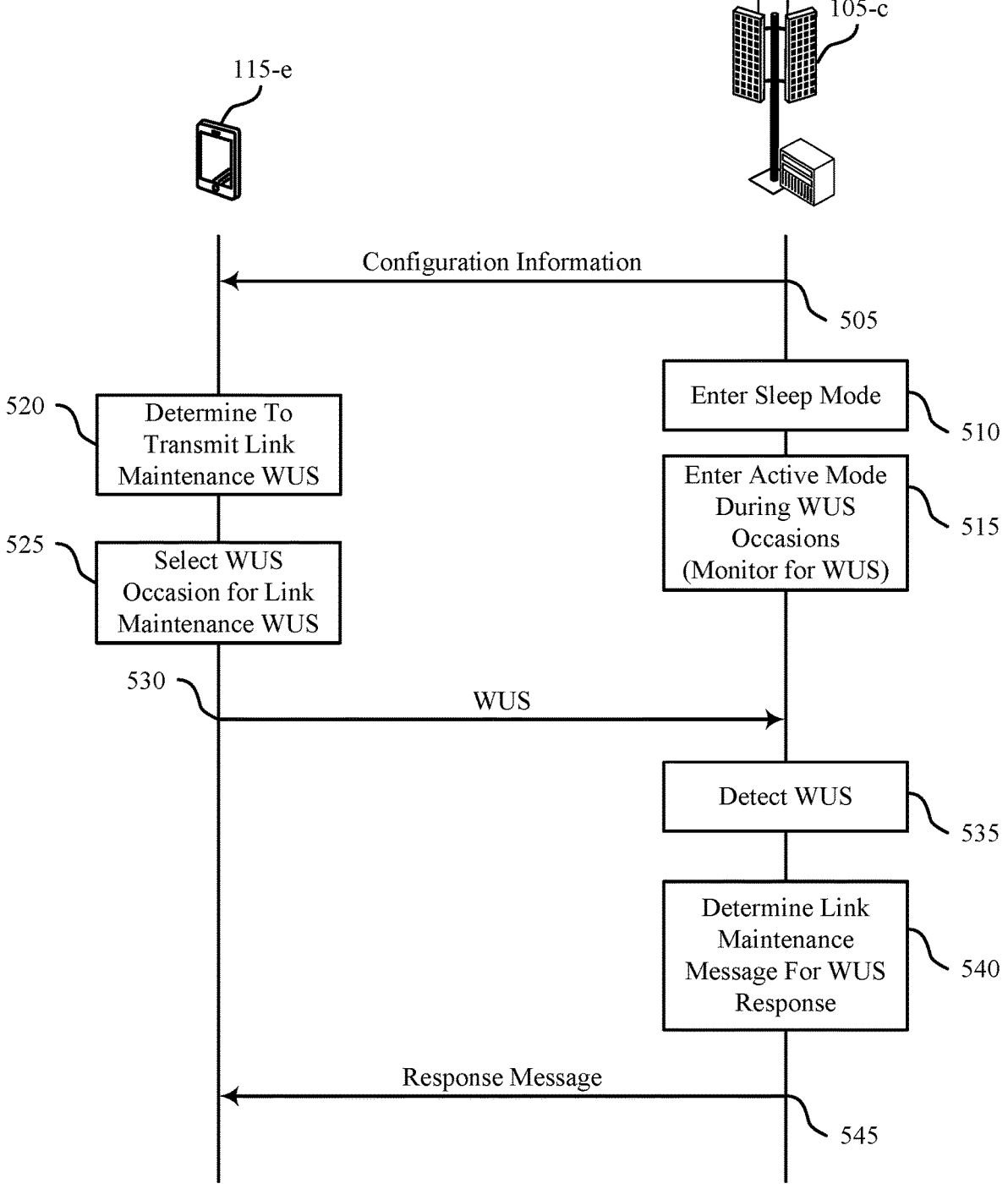
FIG. 5 illustrates an example of a process flow that supports techniques for configuring cell wake-up signal in wireless communications in accordance with one or more aspects of the present disclosure.

FIG. 5 illustrates an example of a process flow 500 that supports techniques for configuring cell wake-up signal in wireless communications in accordance with one or more aspects of the present disclosure. The process flow 500 may include a network entity 105-*c* and a UE 115-*e*, which may be examples of a network entity 105 and a UE 115 as described with reference to FIGS. 1, 2, 3, 4A, and 4B. The process flow 500 may be implemented by the network entity 105-*c* and the UE 115-*e* where a WUS from the UE 115-*e* provides an indication of cell activation or link maintenance. Such techniques may provide for power savings at the network entity 105-*c* associated with a sleep mode, while also enabling link maintenance for a communications link between the network entity 105-*c* and UE 115-*e*, which may thereby enhance overall network efficiency and user experience. In the following description of the process flow 500, the operations between the network entity 105-*c* and the UE 115-*e* may be performed in a different order than the example order shown. Some operations may be omitted from the process flow 500, and other operations may be added to the process flow 500.

At 505, the network entity 105-*c* may transmit, and the UE 115-*e* may receive, configuration information associated with WUS transmissions. As discussed herein, such configuration information may provide characteristics of WUS occasions, such as, for example, a duration of WUS occasions (e.g., a time duration or quantity of symbols/slots), a periodicity of WUS occasions (e.g., time period, quantity of symbols/slots and symbol/slot offset), a frequency band or bandwidth part (BWP), or any combinations thereof. In some cases, the configuration information may be provided via RRC signaling. In some cases, additionally, or alternatively, the configuration information may be provided with one or more system information transmissions (e.g., SIB/ MIB transmissions), in one or more control channel transmissions (e.g., in DCI), and/or in one or more MAC-CE transmissions. In accordance with various aspects, the configuration information may provide a set of WUS occasions, with a first subset of the set of WUS occasions for cell activation requests, and a second subset of the set of WUS occasions for link maintenance. In some cases, the second subset of WUS occasions may be configured with a periodicity and offset within the set of WUS occasions.

At 510, the network entity 105-*c* may transition to a sleep mode. In some cases, the sleep mode may be a relatively low power mode at the network entity 105-*c* in which some or all transmit/receive components are powered down. At 515, the network entity 105-*c* may transition to an active mode to monitor for WUS communications during configured WUS occasions. In some cases, the transition to the active mode may be performed in accordance with a WUS occasion periodicity that is indicated in the configuration information.

At 520, the UE 115-*e* may determine to transmit a link maintenance WUS. Such a determination may be made in accordance with various techniques discussed herein, such as based on a lack of communications via the communications link with the network entity 105-*c* (e.g., SCell communications) for a configured time period, based on a configured link maintenance periodicity, or any combinations thereof). At 525, the UE 115-*e* may select a WUS occasion for transmission of the link maintenance WUS. In some cases, the WUS occasion may be selected from the second subset of WUS occasions that are configured as link maintenance WUS occasions.

At 530, the UE 115-*e* may transmit the WUS to the network entity 105-*c*. In some cases, the WUS may include an ID of the UE 115-*e*. In some cases, the ID may be selected from a set of available IDs that indicate link maintenance is requested, or selected from a different set of available IDs that indicate cell activation is requested, which may be used as an alternative to or in conjunction with WUS occasions configured for link maintenance. As discussed herein, the WUS may be transmitted during a WUS occasion (e.g., a WUS occasion for link maintenance), and the network entity 105-*c*, at 535, may detect the WUS.

At 540, the network entity 105-*c* may determine that the WUS is for link maintenance (e.g., based on the presence of the WUS in a link maintenance WUS occasion, based on an ID provided with the WUS, or any combinations thereof, and determine a WUS response. At 545, the network entity 105-*c* may transmit a response message, which may be received at the UE 115-*e*. In some cases, network response may include a confirmation of the identity of the UE 115-*e* (e.g., based on an ID provided with the WUS). Additionally, or alternatively, the response message may provide a dynamic adaptation of the cell WUS transmission parameters, such as a power adjustment (e.g., a power delta value) for a configured transmission power (e.g., a negative, positive, or zero adjustment to a transmit power for WUS communications), a beam or TCI state update, a RSRP of the received power at the network due to the transmission of the cell WUS (e.g., to allow the UE 115-*e* to monitor the link quality of the cell WUS), or any combinations thereof.

Figure 6:
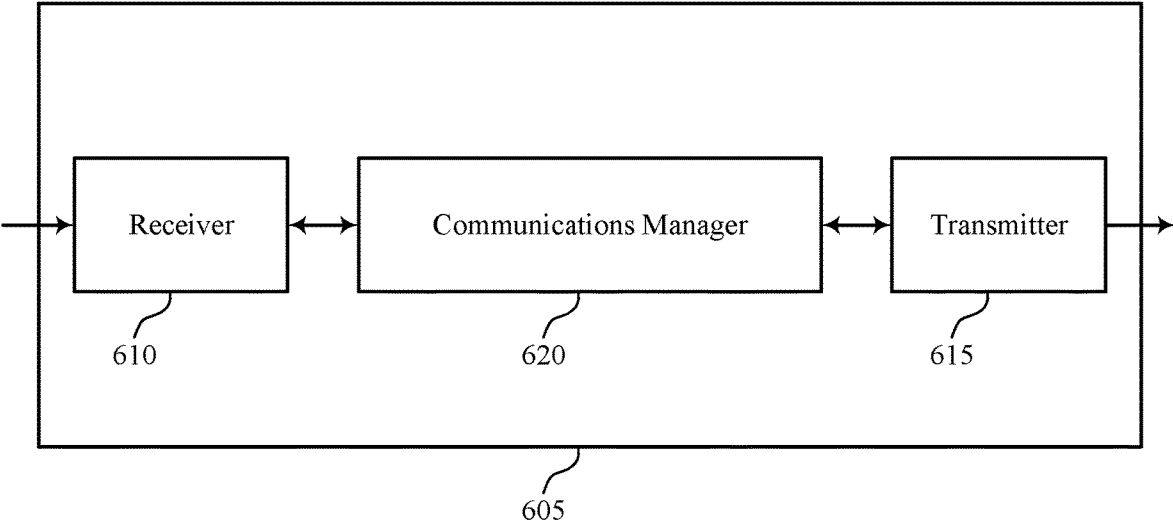
FIGS. 6 and 7 illustrate block diagrams of devices that support techniques for configuring cell wake-up signal in wireless communications in accordance with one or more aspects of the present disclosure.

FIG. 6 illustrates a block diagram 600 of a device 605 that supports techniques for configuring cell wake-up signal in wireless communications in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for configuring cell wake-up signal in wireless communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for configuring cell wake-up signal in wireless communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for configuring cell wake-up signal in wireless communications as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for receiving configuration information for a set of wake-up signal occasions associated with a network entity, the configuration information indicating a first subset of the set of wake-up signal occasions for cell activation requests of a cell associated with the network entity, and a second subset of the set of wake-up signal occasions for link maintenance communications associated with a communication link between the UE and the network entity. The communications manager 620 may be configured as or otherwise support a means for transmitting a first wake-up signal during a first wake-up signal occasion of the first subset of wake-up signal occasions based on a presence of data traffic that is to be transmitted from the UE. The communications manager 620 may be configured as or otherwise support a means for transmitting a second wake-up signal during a second wake-up signal occasion of the second subset of wake-up signal occasions based on an elapsed time from a prior communication with the network entity exceeding a threshold value.

By including or configuring the communications manager 620 in accordance with examples as described herein, the device 605 (e.g., a processor controlling or otherwise coupled with the receiver 610, the transmitter 615, the communications manager 620, or a combination thereof) may support link maintenance techniques for WUS configurations that may provide for enhanced reliability of communications links for WUS communications, reduced latency and link failure, adaptation of transmission parameters for WUS communications, and enhanced system efficiency.

Figure 7:
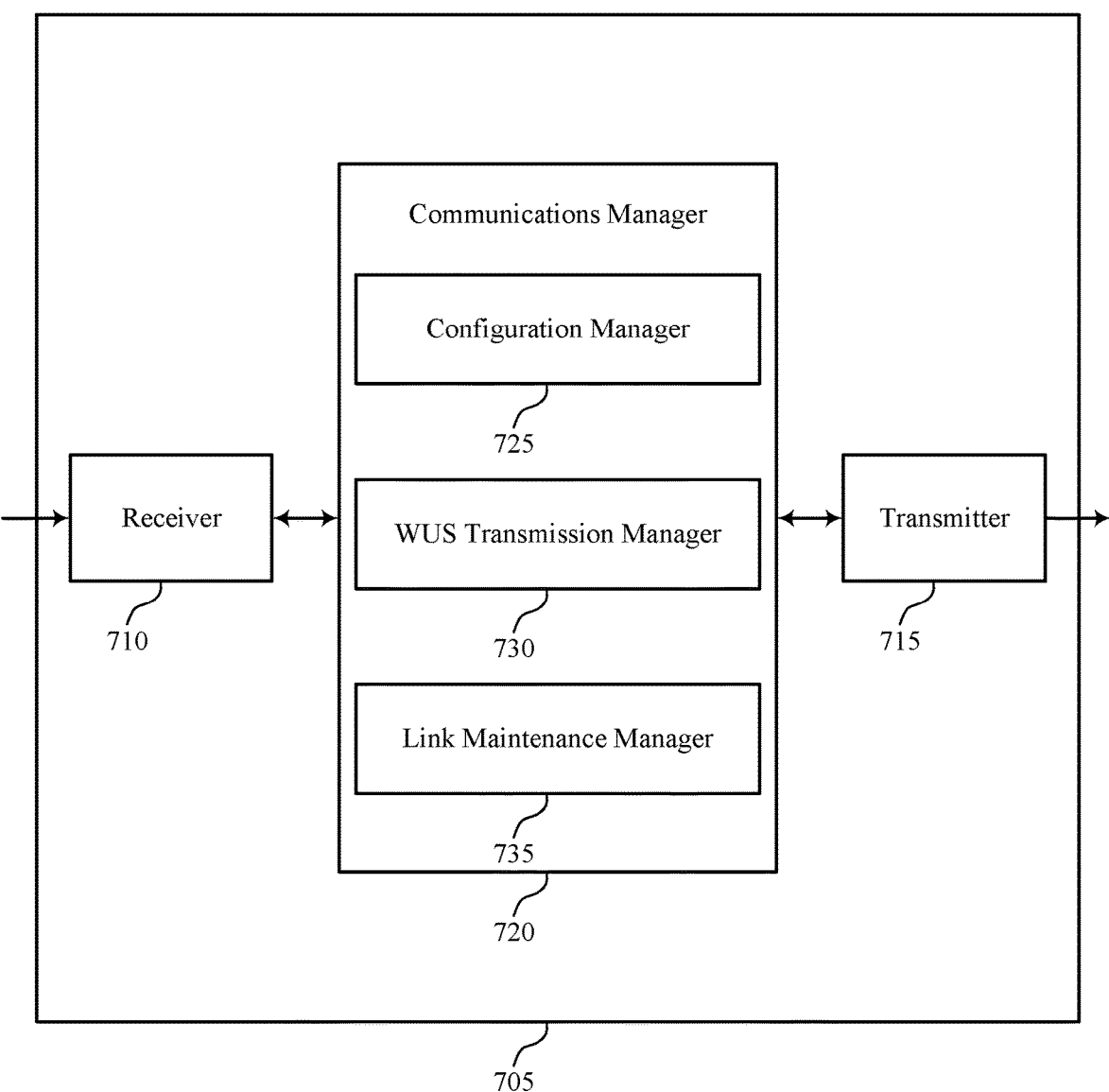

FIG. 7 illustrates a block diagram 700 of a device 705 that supports techniques for configuring cell wake-up signal in wireless communications in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for configuring cell wake-up signal in wireless communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for configuring cell wake-up signal in wireless communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for configuring cell wake-up signal in wireless communications as described herein. For example, the communications manager 720 may include a configuration manager 725, a WUS transmission manager 730, a link maintenance manager 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The configuration manager 725 may be configured as or otherwise support a means for receiving configuration information for a set of wake-up signal occasions associated with a network entity, the configuration information indicating a first subset of the set of wake-up signal occasions for cell activation requests of a cell associated with the network entity, and a second subset of the set of wake-up signal occasions for link maintenance communications associated with a communication link between the UE and the network entity. The WUS transmission manager 730 may be configured as or otherwise support a means for transmitting a first wake-up signal during a first wake-up signal occasion of the first subset of wake-up signal occasions based on a presence of data traffic that is to be transmitted from the UE. The link maintenance manager 735 may be configured as or otherwise support a means for transmitting a second wake-up signal during a second wake-up signal occasion of the second subset of wake-up signal occasions based on an elapsed time from a prior communication with the network entity exceeding a threshold value.

Figure 8:
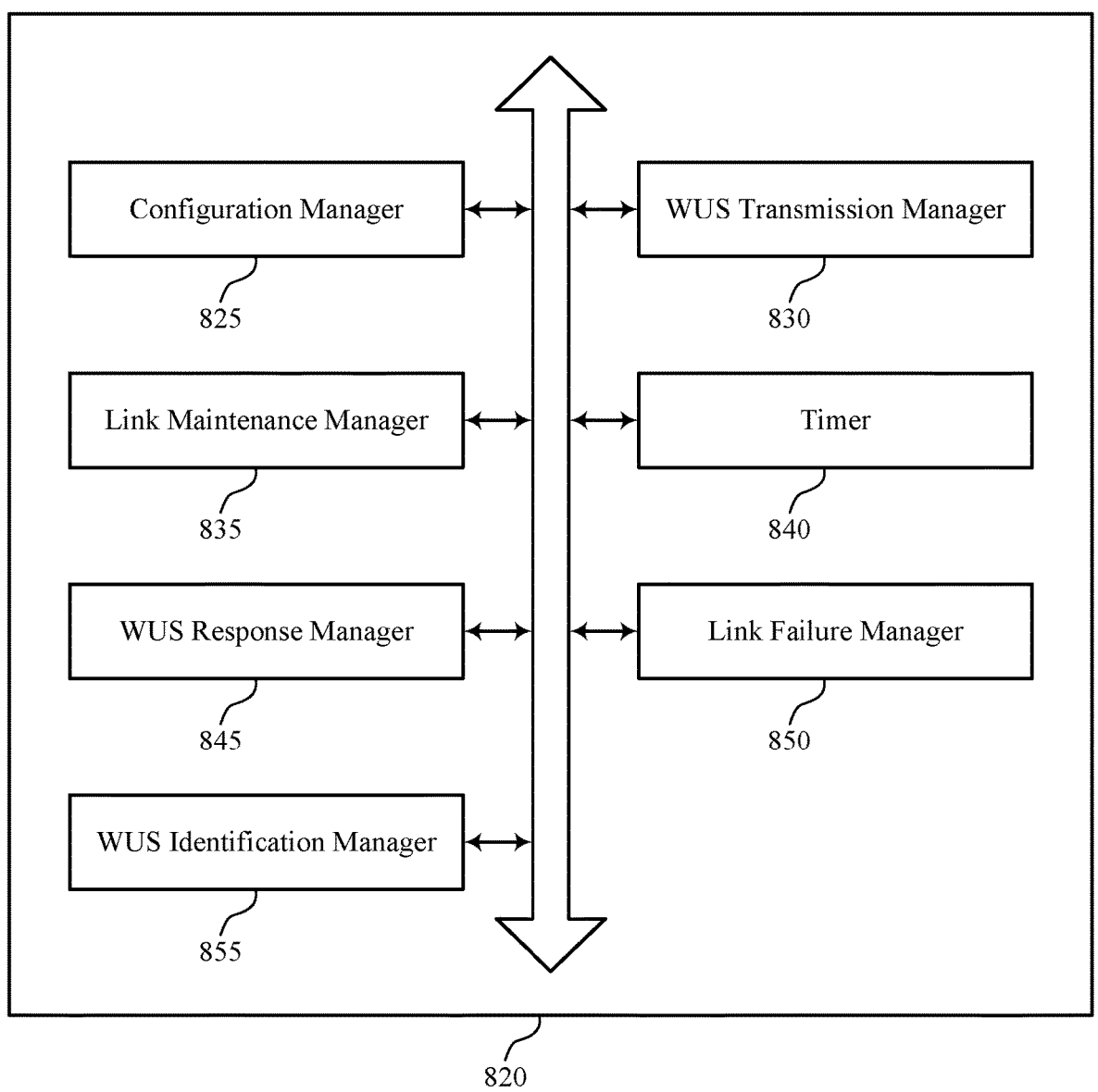
FIG. 8 illustrates a block diagram of a communications manager that supports techniques for configuring cell wake-up signal in wireless communications in accordance with one or more aspects of the present disclosure.

FIG. 8 illustrates a block diagram 800 of a communications manager 820 that supports techniques for configuring cell wake-up signal in wireless communications in accordance with one or more aspects of the present disclosure. The communications manager 820 may be an example of aspects of a communications manager 620, a communications manager 720, or both, as described herein. The communications manager 820, or various components thereof, may be an example of means for performing various aspects of techniques for configuring cell wake-up signal in wireless communications as described herein. For example, the communications manager 820 may include a configuration manager 825, a WUS transmission manager 830, a link maintenance manager 835, a timer 840, a WUS response manager 845, a link failure manager 850, a WUS identification manager 855, or any combination thereof. Each of these components may communicate, directly or indirectly, with one another (e.g., via one or more buses).

The communications manager 820 may support wireless communication at a UE in accordance with examples as disclosed herein. The configuration manager 825 may be configured as or otherwise support a means for receiving configuration information for a set of wake-up signal occasions associated with a network entity, the configuration information indicating a first subset of the set of wake-up signal occasions for cell activation requests of a cell associated with the network entity, and a second subset of the set of wake-up signal occasions for link maintenance communications associated with a communication link between the UE and the network entity. The WUS transmission manager 830 may be configured as or otherwise support a means for transmitting a first wake-up signal during a first wake-up signal occasion of the first subset of wake-up signal occasions based on a presence of data traffic that is to be transmitted from the UE. The link maintenance manager 835 may be configured as or otherwise support a means for transmitting a second wake-up signal during a second wake-up signal occasion of the second subset of wake-up signal occasions based on an elapsed time from a prior communication with the network entity exceeding a threshold value. In some examples, the second wake-up signal indicates that link maintenance of the communication link between the UE and the network entity is requested instead of cell activation of the cell associated with the network entity.

In some examples, to support receiving the configuration information, the configuration manager 825 may be configured as or otherwise support a means for receiving one or more of a periodicity or an offset associated with the set of wake-up signal occasions that indicates the second subset of wake-up signal occasions.

In some examples, the timer 840 may be configured as or otherwise support a means for resetting the elapsed time from the prior communication responsive to one or more communications with the network entity using the communication link between the UE and the network entity. In some examples, the timer 840 may be configured as or otherwise support a means for resetting the elapsed time from the prior communication responsive to receiving a network response to the first wake-up signal.

In some examples, the WUS response manager 845 may be configured as or otherwise support a means for receiving a wake-up signal response from the network entity responsive to the second wake-up signal. In some examples, the WUS response manager 845 may be configured as or otherwise support a means for resetting the elapsed time from the prior communication responsive to the wake-up signal response. In some examples, the wake-up signal response includes an identification of a source of an associated wake-up signal, and where the resetting the elapsed time is responsive to the identification corresponding to an identity of the UE. In some examples, the identification of the source of the associated wake-up signal includes one or more of a random access preamble identification, an identification provided with a scheduling request, a radio network temporary identifier of the UE, or any combinations thereof.

In some examples, the link maintenance manager 835 may be configured as or otherwise support a means for adjusting one or more transmission parameters associated with the communication link between the UE and the network entity based on the wake-up signal response. In some examples, the wake-up signal response indicates one or more of a transmission power adjustment, a beam update, a TCI state update, a received power associated with the second wake-up signal, or any combinations thereof.

In some examples, the link failure manager 850 may be configured as or otherwise support a means for transmitting a link failure indication to the network entity responsive to a failure to receive a response to the second wake-up signal. In some examples, the link failure manager 850 may be configured as or otherwise support a means for transmitting one or more additional wake-up signals during one or more other wake-up signal occasions of the second subset of wake-up signal occasions responsive to a failure to receive a response to the second wake-up signal. In some examples, the link failure manager 850 may be configured as or otherwise support a means for transmitting the link failure indication to the network entity responsive to a failure to receive a response to the one or more additional wake-up signals. In some examples, the link failure indication is transmitted via a different cell associated with the network entity, using a different wake-up signal occasion of a different wake-up signal configuration, using an initial access procedure, or any combinations thereof.

Figure 9:
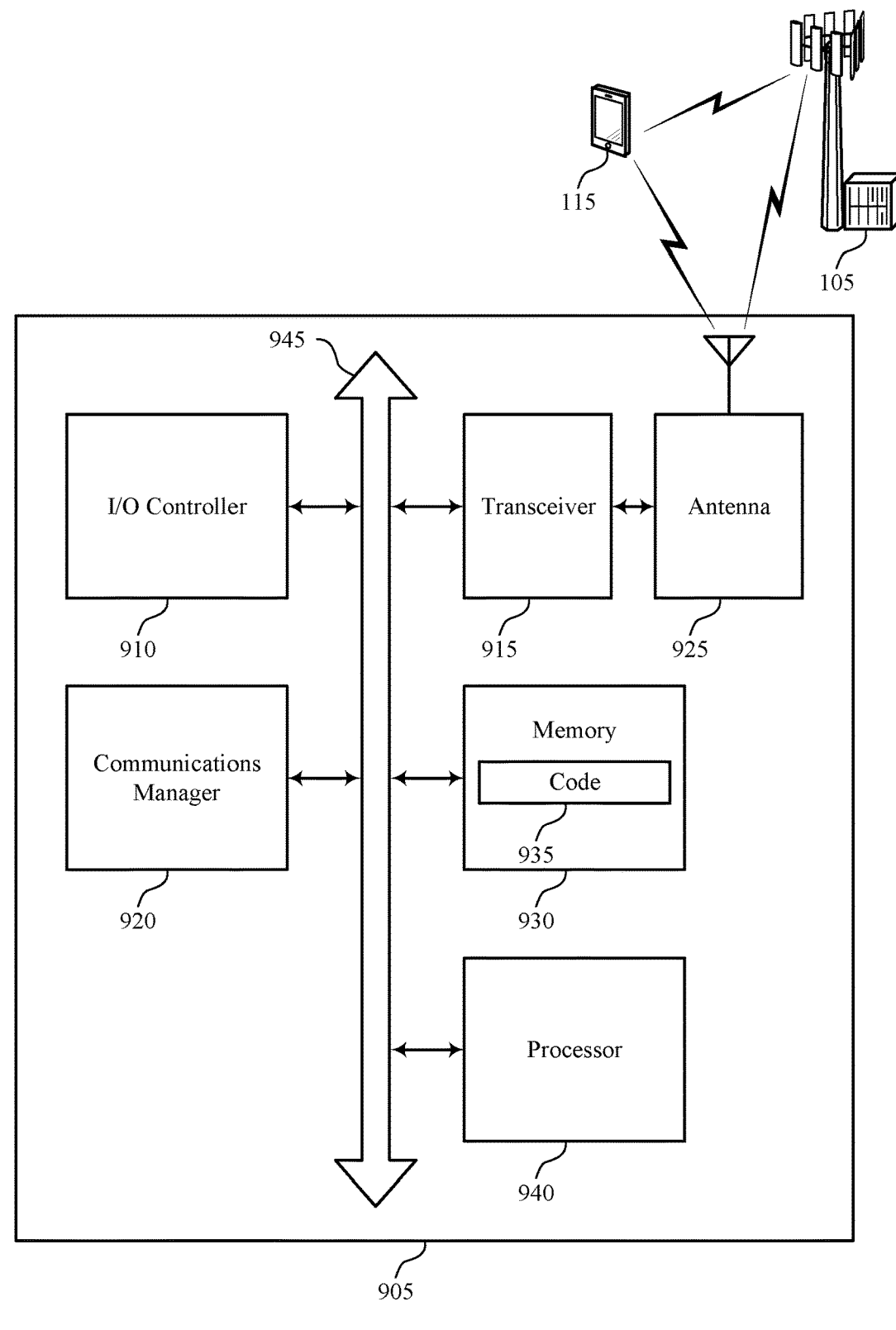
FIG. 9 illustrates a diagram of a system including a device that supports techniques for configuring cell wake-up signal in wireless communications in accordance with one or more aspects of the present disclosure.

FIG. 9 illustrates a diagram of a system 900 including a device 905 that supports techniques for configuring cell wake-up signal in wireless communications in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for configuring cell wake-up signal in wireless communications). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving configuration information for a set of wake-up signal occasions associated with a network entity, the configuration information indicating a first subset of the set of wake-up signal occasions for cell activation requests of a cell associated with the network entity, and a second subset of the set of wake-up signal occasions for link maintenance communications associated with a communication link between the UE and the network entity. The communications manager 920 may be configured as or otherwise support a means for transmitting a first wake-up signal during a first wake-up signal occasion of the first subset of wake-up signal occasions based on a presence of data traffic that is to be transmitted from the UE. The communications manager 920 may be configured as or otherwise support a means for transmitting a second wake-up signal during a second wake-up signal occasion of the second subset of wake-up signal occasions based on an elapsed time from a prior communication with the network entity exceeding a threshold value.

By including or configuring the communications manager 920 in accordance with examples as described herein, the device 905 may support link maintenance techniques for WUS configurations that may provide for enhanced reliability of communications links for WUS communications, reduced latency and link failure, adaptation of transmission parameters for WUS communications, and enhanced system efficiency.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for configuring cell wake-up signal in wireless communications as described herein, or the processor 940 and the memory 930 may be otherwise configured to perform or support such operations.

Figure 10:
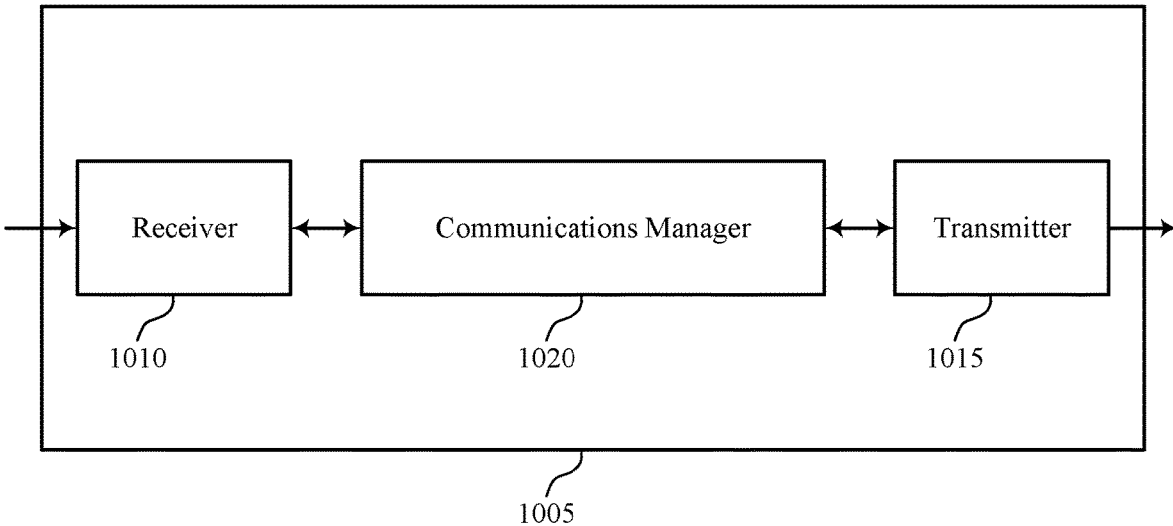
FIGS. 10 and 11 illustrate block diagrams of devices that support techniques for configuring cell wake-up signal in wireless communications in accordance with one or more aspects of the present disclosure.

FIG. 10 illustrates a block diagram 1000 of a device 1005 that supports techniques for configuring cell wake-up signal in wireless communications in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of techniques for configuring cell wake-up signal in wireless communications as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for transmitting configuration information for a set of wake-up signal occasions associated with a network entity to a UE, the configuration information indicating a first subset of the set of wake-up signal occasions for cell activation requests of a cell associated with the network entity, and a second subset of the set of wake-up signal occasions for link maintenance communications associated with a communication link between the UE and the network entity. The communications manager 1020 may be configured as or otherwise support a means for monitoring for a first wake-up signal during a first wake-up signal occasion of the first subset of wake-up signal occasions that indicates a presence of data traffic that is to be transmitted from the UE. The communications manager 1020 may be configured as or otherwise support a means for monitoring for a second wake-up signal during a second wake-up signal occasion of the second subset of wake-up signal occasions that indicates a link maintenance associated with the communication link is requested.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support link maintenance techniques for WUS configurations that may provide for enhanced reliability of communications links for WUS communications, reduced latency and link failure, adaptation of transmission parameters for WUS communications, and enhanced system efficiency.

Figure 11:
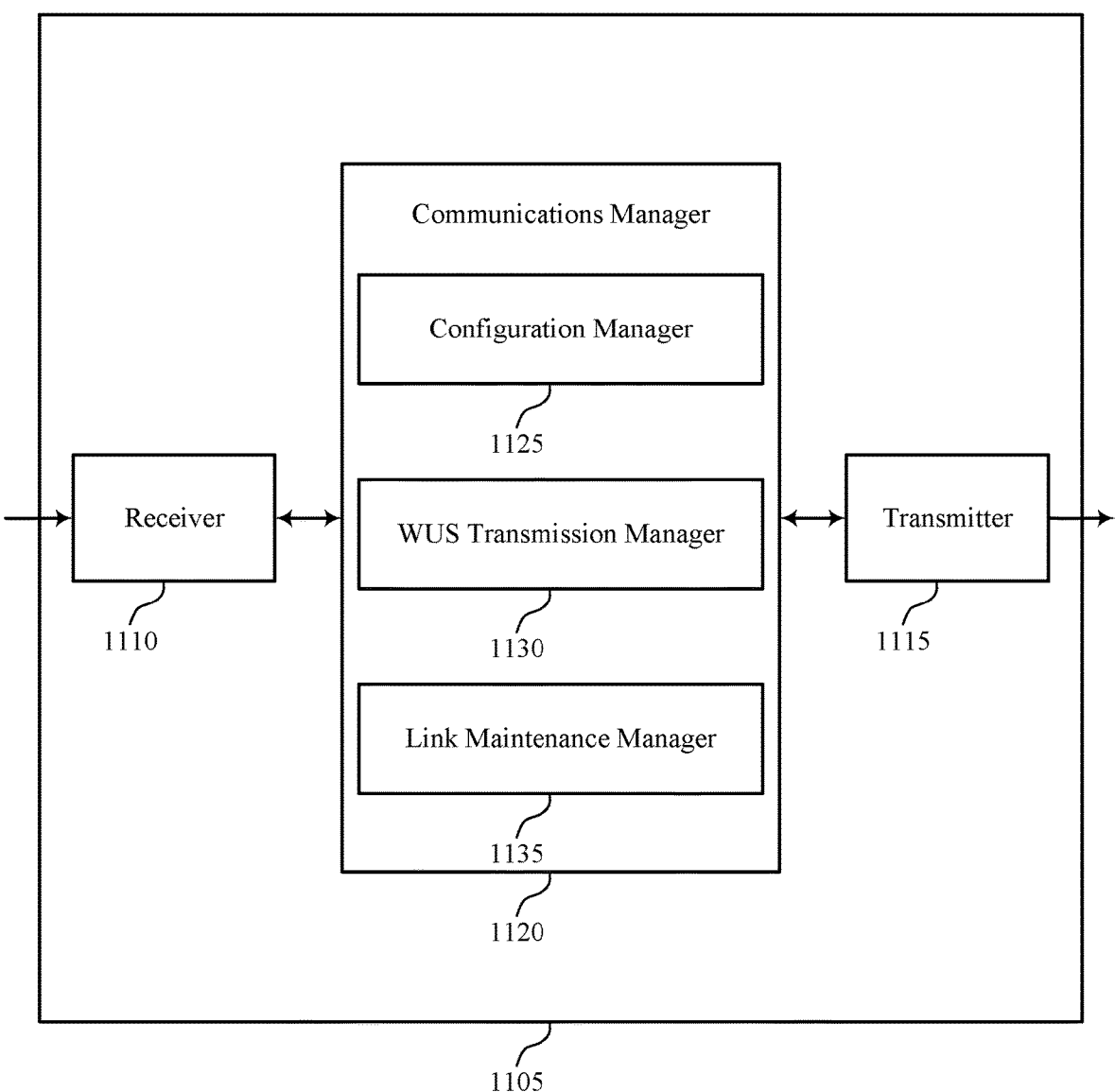

FIG. 11 illustrates a block diagram 1100 of a device 1105 that supports techniques for configuring cell wake-up signal in wireless communications in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of techniques for configuring cell wake-up signal in wireless communications as described herein. For example, the communications manager 1120 may include a configuration manager 1125, a WUS transmission manager 1130, a link maintenance manager 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The configuration manager 1125 may be configured as or otherwise support a means for transmitting configuration information for a set of wake-up signal occasions associated with a network entity to a UE, the configuration information indicating a first subset of the set of wake-up signal occasions for cell activation requests of a cell associated with the network entity, and a second subset of the set of wake-up signal occasions for link maintenance communications associated with a communication link between the UE and the network entity. The WUS transmission manager 1130 may be configured as or otherwise support a means for monitoring for a first wake-up signal during a first wake-up signal occasion of the first subset of wake-up signal occasions that indicates a presence of data traffic that is to be transmitted from the UE. The link maintenance manager 1135 may be configured as or otherwise support a means for monitoring for a second wake-up signal during a second wake-up signal occasion of the second subset of wake-up signal occasions that indicates a link maintenance associated with the communication link is requested.

Figure 12:
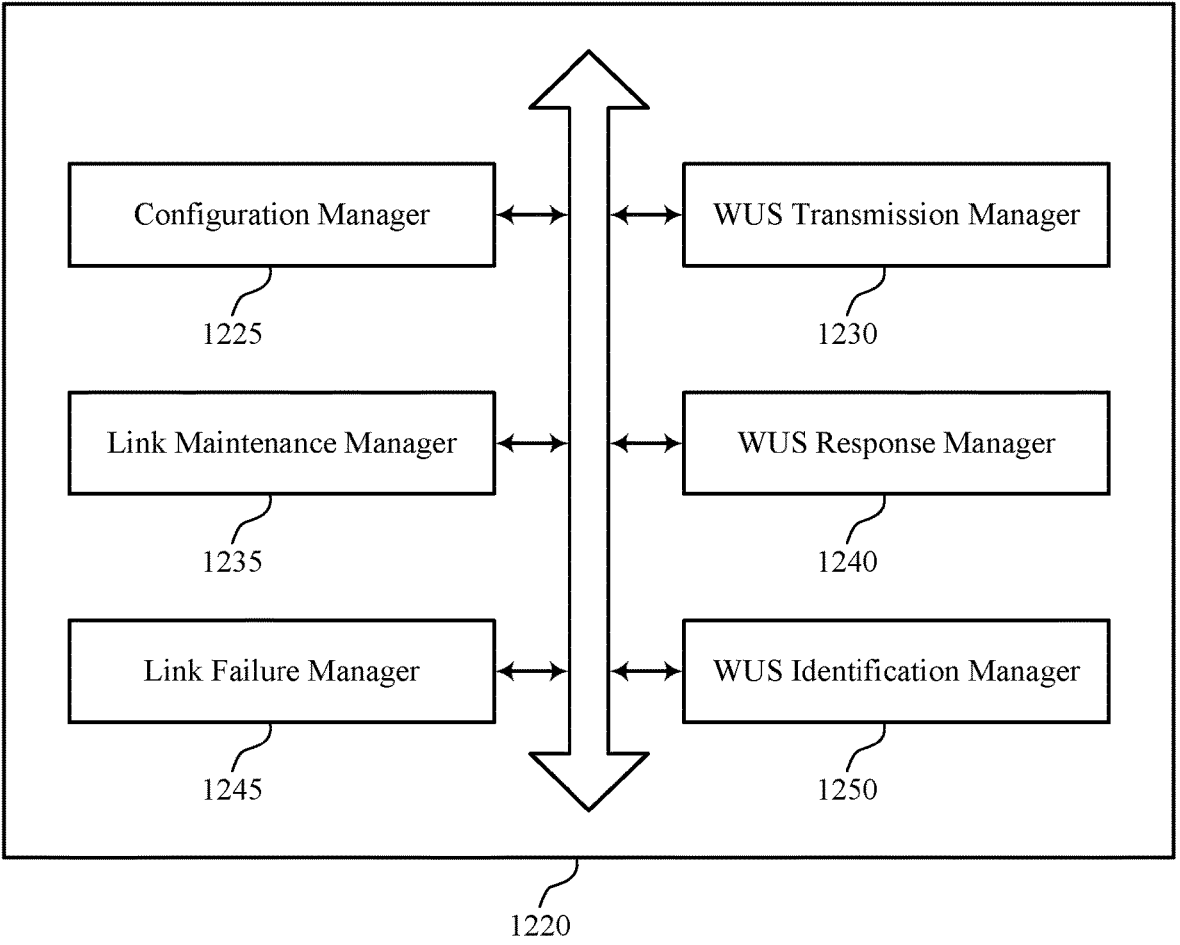
FIG. 12 illustrates a block diagram of a communications manager that supports techniques for configuring cell wake-up signal in wireless communications in accordance with one or more aspects of the present disclosure.

FIG. 12 illustrates a block diagram 1200 of a communications manager 1220 that supports techniques for configuring cell wake-up signal in wireless communications in accordance with one or more aspects of the present disclosure. The communications manager 1220 may be an example of aspects of a communications manager 1020, a communications manager 1120, or both, as described herein.

The communications manager 1220, or various components thereof, may be an example of means for performing various aspects of techniques for configuring cell wake-up signal in wireless communications as described herein. For example, the communications manager 1220 may include a configuration manager 1225, a WUS transmission manager 1230, a link maintenance manager 1235, a WUS response manager 1240, a link failure manager 1245, a WUS identification manager 1250, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The configuration manager 1225 may be configured as or otherwise support a means for transmitting configuration information for a set of wake-up signal occasions associated with a network entity to a UE, the configuration information indicating a first subset of the set of wake-up signal occasions for cell activation requests of a cell associated with the network entity, and a second subset of the set of wake-up signal occasions for link maintenance communications associated with a communication link between the UE and the network entity. The WUS transmission manager 1230 may be configured as or otherwise support a means for monitoring for a first wake-up signal during a first wake-up signal occasion of the first subset of wake-up signal occasions that indicates a presence of data traffic that is to be transmitted from the UE. The link maintenance manager 1235 may be configured as or otherwise support a means for monitoring for a second wake-up signal during a second wake-up signal occasion of the second subset of wake-up signal occasions that indicates a link maintenance associated with the communication link is requested.

In some examples, the second wake-up signal indicates that link maintenance of the communication link between the UE and the network entity is requested instead of cell activation of the cell associated with the network entity. In some examples, to support transmitting the configuration information, the configuration manager 1225 may be configured as or otherwise support a means for transmitting one or more of a periodicity or an offset associated with the set of wake-up signal occasions that indicates the second subset of wake-up signal occasions. In some examples, to support transmitting the configuration information, the configuration manager 1225 may be configured as or otherwise support a means for transmitting an indication of a time threshold value associated with the second subset of wake-up signal occasions, where a wake-up signal is to be transmitted in the second subset of wake-up signal occasions responsive to an elapsed time from a prior communication via the communication link exceeding the time threshold value.

In some examples, the WUS response manager 1240 may be configured as or otherwise support a means for transmitting a wake-up signal response to the UE responsive to the second wake-up signal. In some examples, the wake-up signal response includes an identification of a source of the second wake-up signal. In some examples, the identification of the source of the second wake-up signal includes one or more of a random access preamble identification, an identification provided with a scheduling request, a radio network temporary identifier of the UE, or any combinations thereof.

In some examples, the link maintenance manager 1235 may be configured as or otherwise support a means for adjusting one or more transmission parameters associated with the communication link between the UE and the network entity based on the second wake-up signal. In some examples, the wake-up signal response indicates one or more of a transmission power adjustment, a beam update, a TCI state update, a received power associated with the second wake-up signal, or any combinations thereof.

In some examples, the link failure manager 1245 may be configured as or otherwise support a means for receiving a link failure indication from the UE that indicates a failure to receive a response to the second wake-up signal. In some examples, the link failure manager 1245 may be configured as or otherwise support a means for initiating a beam failure recovery procedure responsive to the link failure indication. In some examples, the link failure indication is received via a different cell associated with the network entity, via a different wake-up signal occasion of a different wake-up signal configuration, via an initial access procedure, or any combinations thereof.

Figure 13:
FIG. 13 illustrates a diagram of a system including a device that supports techniques for configuring cell wake-up signal in wireless communications in accordance with one or more aspects of the present disclosure.

FIG. 13 illustrates a diagram of a system 1300 including a device 1305 that supports techniques for configuring cell wake-up signal in wireless communications in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting techniques for configuring cell wake-up signal in wireless communications). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for transmitting configuration information for a set of wake-up signal occasions associated with a network entity to a UE, the configuration information indicating a first subset of the set of wake-up signal occasions for cell activation requests of a cell associated with the network entity, and a second subset of the set of wake-up signal occasions for link maintenance communications associated with a communication link between the UE and the network entity. The communications manager 1320 may be configured as or otherwise support a means for monitoring for a first wake-up signal during a first wake-up signal occasion of the first subset of wake-up signal occasions that indicates a presence of data traffic that is to be transmitted from the UE. The communications manager 1320 may be configured as or otherwise support a means for monitoring for a second wake-up signal during a second wake-up signal occasion of the second subset of wake-up signal occasions that indicates a link maintenance associated with the communication link is requested.

By including or configuring the communications manager 1320 in accordance with examples as described herein, the device 1305 may support link maintenance techniques for WUS configurations that may provide for enhanced reliability of communications links for WUS communications, reduced latency and link failure, adaptation of transmission parameters for WUS communications, and enhanced system efficiency.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of techniques for configuring cell wake-up signal in wireless communications as described herein, or the processor 1335 and the memory 1325 may be otherwise configured to perform or support such operations.

FIG. 14 illustrates a flowchart showing a method 1400 that supports techniques for configuring cell wake-up signal in wireless communications in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving configuration information for a set of wake-up signal occasions associated with a network entity, the configuration information indicating a first subset of the set of wake-up signal occasions for cell activation requests of a cell associated with the network entity, and a second subset of the set of wake-up signal occasions for link maintenance communications associated with a communication link between the UE and the network entity. The operations of 1405 may be performed in accordance with examples as disclosed herein. In some examples, aspects of the operations of 1405 may be performed by a configuration manager 825 as described with reference to FIG. 8.

Optionally, at 1410, the method may include receiving one or more of a periodicity or an offset associated with the set of wake-up signal occasions that indicates the second subset of wake-up signal occasions. The operations of 1410 may be performed in accordance with examples as disclosed herein. In some examples, aspects of the operations of 1410 may be performed by a configuration manager 825 as described with reference to FIG. 8.

At 1415, the method may include transmitting a first wake-up signal during a first wake-up signal occasion of the first subset of wake-up signal occasions based on a presence of data traffic that is to be transmitted from the UE. The operations of 1415 may be performed in accordance with examples as disclosed herein. In some examples, aspects of the operations of 1415 may be performed by a WUS transmission manager 830 as described with reference to FIG. 8.

At 1420, the method may include transmitting a second wake-up signal during a second wake-up signal occasion of the second subset of wake-up signal occasions based on an elapsed time from a prior communication with the network entity exceeding a threshold value. The operations of 1420 may be performed in accordance with examples as disclosed herein. In some examples, aspects of the operations of 1420 may be performed by a link maintenance manager 835 as described with reference to FIG. 8.

FIG. 15 illustrates a flowchart showing a method 1500 that supports techniques for configuring cell wake-up signal in wireless communications in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving configuration information for a set of wake-up signal occasions associated with a network entity, the configuration information indicating a first subset of the set of wake-up signal occasions for cell activation requests of a cell associated with the network entity, and a second subset of the set of wake-up signal occasions for link maintenance communications associated with a communication link between the UE and the network entity. The operations of 1505 may be performed in accordance with examples as disclosed herein. In some examples, aspects of the operations of 1505 may be performed by a configuration manager 825 as described with reference to FIG. 8.

At 1510, the method may include resetting an elapsed time from the prior communication responsive to one or more communications with the network entity using the communication link between the UE and the network entity. The operations of 1510 may be performed in accordance with examples as disclosed herein. In some examples, aspects of the operations of 1510 may be performed by a timer 840 as described with reference to FIG. 8.

At 1515, the method may include transmitting a first wake-up signal during a first wake-up signal occasion of the first subset of wake-up signal occasions based on a presence of data traffic that is to be transmitted from the UE. The operations of 1515 may be performed in accordance with examples as disclosed herein. In some examples, aspects of the operations of 1515 may be performed by a WUS transmission manager 830 as described with reference to FIG. 8.

At 1520, the method may include resetting the elapsed time from the prior communication responsive to receiving a network response to the first wake-up signal. The operations of 1520 may be performed in accordance with examples as disclosed herein. In some examples, aspects of the operations of 1520 may be performed by a timer 840 as described with reference to FIG. 8.

At 1525, the method may include transmitting a second wake-up signal during a second wake-up signal occasion of the second subset of wake-up signal occasions based on the elapsed time from a prior communication with the network entity exceeding a threshold value. The operations of 1525 may be performed in accordance with examples as disclosed herein. In some examples, aspects of the operations of 1525 may be performed by a link maintenance manager 835 as described with reference to FIG. 8.

FIG. 16 illustrates a flowchart showing a method 1600 that supports techniques for configuring cell wake-up signal in wireless communications in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving configuration information for a set of wake-up signal occasions associated with a network entity, the configuration information indicating a first subset of the set of wake-up signal occasions for cell activation requests of a cell associated with the network entity, and a second subset of the set of wake-up signal occasions for link maintenance communications associated with a communication link between the UE and the network entity. The operations of 1605 may be performed in accordance with examples as disclosed herein. In some examples, aspects of the operations of 1605 may be performed by a configuration manager 825 as described with reference to FIG. 8.

At 1610, the method may include transmitting a first wake-up signal during a first wake-up signal occasion of the first subset of wake-up signal occasions based on a presence of data traffic that is to be transmitted from the UE. The operations of 1610 may be performed in accordance with examples as disclosed herein. In some examples, aspects of the operations of 1610 may be performed by a WUS transmission manager 830 as described with reference to FIG. 8.

At 1615, the method may include transmitting a second wake-up signal during a second wake-up signal occasion of the second subset of wake-up signal occasions based on an elapsed time from a prior communication with the network entity exceeding a threshold value. The operations of 1615 may be performed in accordance with examples as disclosed herein. In some examples, aspects of the operations of 1615 may be performed by a link maintenance manager 835 as described with reference to FIG. 8.

At 1620, the method may include receiving a wake-up signal response from the network entity responsive to the second wake-up signal. The operations of 1620 may be performed in accordance with examples as disclosed herein. In some examples, aspects of the operations of 1620 may be performed by a WUS response manager 845 as described with reference to FIG. 8.

At 1625, the method may include resetting the elapsed time from the prior communication responsive to the wake-up signal response. The operations of 1625 may be performed in accordance with examples as disclosed herein. In some examples, aspects of the operations of 1625 may be performed by a WUS response manager 845 as described with reference to FIG. 8.

FIG. 17 illustrates a flowchart showing a method 1700 that supports techniques for configuring cell wake-up signal in wireless communications in accordance with one or more aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1705, the method may include receiving configuration information for a set of wake-up signal occasions associated with a network entity, the configuration information indicating a first subset of the set of wake-up signal occasions for cell activation requests of a cell associated with the network entity, and a second subset of the set of wake-up signal occasions for link maintenance communications associated with a communication link between the UE and the network entity. The operations of 1705 may be performed in accordance with examples as disclosed herein. In some examples, aspects of the operations of 1705 may be performed by a configuration manager 825 as described with reference to FIG. 8.

At 1710, the method may include transmitting a first wake-up signal during a first wake-up signal occasion of the first subset of wake-up signal occasions based on a presence of data traffic that is to be transmitted from the UE. The operations of 1710 may be performed in accordance with examples as disclosed herein. In some examples, aspects of the operations of 1710 may be performed by a WUS transmission manager 830 as described with reference to FIG. 8.

At 1715, the method may include transmitting a second wake-up signal during a second wake-up signal occasion of the second subset of wake-up signal occasions based on an elapsed time from a prior communication with the network entity exceeding a threshold value. The operations of 1715 may be performed in accordance with examples as disclosed herein. In some examples, aspects of the operations of 1715 may be performed by a link maintenance manager 835 as described with reference to FIG. 8.

At 1720, the method may include receiving a wake-up signal response from the network entity responsive to the second wake-up signal. The operations of 1720 may be performed in accordance with examples as disclosed herein. In some examples, aspects of the operations of 1720 may be performed by a WUS response manager 845 as described with reference to FIG. 8.

At 1725, the method may include resetting the elapsed time from the prior communication responsive to the wake-up signal response. The operations of 1725 may be performed in accordance with examples as disclosed herein. In some examples, aspects of the operations of 1725 may be performed by a WUS response manager 845 as described with reference to FIG. 8.

At 1730, the method may include adjusting one or more transmission parameters associated with the communication link between the UE and the network entity based on the wake-up signal response. The operations of 1730 may be performed in accordance with examples as disclosed herein. In some examples, aspects of the operations of 1730 may be performed by a link maintenance manager 835 as described with reference to FIG. 8.

FIG. 18 illustrates a flowchart showing a method 1800 that supports techniques for configuring cell wake-up signal in wireless communications in accordance with one or more aspects of the present disclosure. The operations of the method 1800 may be implemented by a UE or its components as described herein. For example, the operations of the method 1800 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1805, the method may include receiving configuration information for a set of wake-up signal occasions associated with a network entity, the configuration information indicating a first subset of the set of wake-up signal occasions for cell activation requests of a cell associated with the network entity, and a second subset of the set of wake-up signal occasions for link maintenance communications associated with a communication link between the UE and the network entity. The operations of 1805 may be performed in accordance with examples as disclosed herein. In some examples, aspects of the operations of 1805 may be performed by a configuration manager 825 as described with reference to FIG. 8.

At 1810, the method may include transmitting a first wake-up signal during a first wake-up signal occasion of the first subset of wake-up signal occasions based on a presence of data traffic that is to be transmitted from the UE. The operations of 1810 may be performed in accordance with examples as disclosed herein. In some examples, aspects of the operations of 1810 may be performed by a WUS transmission manager 830 as described with reference to FIG. 8.

At 1815, the method may include transmitting a second wake-up signal during a second wake-up signal occasion of the second subset of wake-up signal occasions based on an elapsed time from a prior communication with the network entity exceeding a threshold value. The operations of 1815 may be performed in accordance with examples as disclosed herein. In some examples, aspects of the operations of 1815 may be performed by a link maintenance manager 835 as described with reference to FIG. 8.

At 1820, the method may include transmitting a link failure indication to the network entity responsive to a failure to receive a response to the second wake-up signal. The operations of 1820 may be performed in accordance with examples as disclosed herein. In some examples, aspects of the operations of 1820 may be performed by a link failure manager 850 as described with reference to FIG. 8.

FIG. 19 illustrates a flowchart showing a method 1900 that supports techniques for configuring cell wake-up signal in wireless communications in accordance with one or more aspects of the present disclosure. The operations of the method 1900 may be implemented by a network entity or its components as described herein. For example, the operations of the method 1900 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1905, the method may include transmitting configuration information for a set of wake-up signal occasions associated with a network entity to a UE, the configuration information indicating a first subset of the set of wake-up signal occasions for cell activation requests of a cell associated with the network entity, and a second subset of the set of wake-up signal occasions for link maintenance communications associated with a communication link between the UE and the network entity. The operations of 1905 may be performed in accordance with examples as disclosed herein. In some examples, aspects of the operations of 1905 may be performed by a configuration manager 1225 as described with reference to FIG. 12.

Optionally, at 1910, the method may include transmitting one or more of a periodicity or an offset associated with the set of wake-up signal occasions that indicates the second subset of wake-up signal occasions. The operations of 1910 may be performed in accordance with examples as disclosed herein. In some examples, aspects of the operations of 1910 may be performed by a configuration manager 1225 as described with reference to FIG. 12.

At 1915, the method may include monitoring for a first wake-up signal during a first wake-up signal occasion of the first subset of wake-up signal occasions that indicates a presence of data traffic that is to be transmitted from the UE. The operations of 1915 may be performed in accordance with examples as disclosed herein. In some examples, aspects of the operations of 1915 may be performed by a WUS transmission manager 1230 as described with reference to FIG. 12.

At 1920, the method may include monitoring for a second wake-up signal during a second wake-up signal occasion of the second subset of wake-up signal occasions that indicates a link maintenance associated with the communication link is requested. The operations of 1920 may be performed in accordance with examples as disclosed herein. In some examples, aspects of the operations of 1920 may be performed by a link maintenance manager 1235 as described with reference to FIG. 12.

FIG. 20 illustrates a flowchart showing a method 2000 that supports techniques for configuring cell wake-up signal in wireless communications in accordance with one or more aspects of the present disclosure. The operations of the method 2000 may be implemented by a network entity or its components as described herein. For example, the operations of the method 2000 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2005, the method may include transmitting configuration information for a set of wake-up signal occasions associated with a network entity to a UE, the configuration information indicating a first subset of the set of wake-up signal occasions for cell activation requests of a cell associated with the network entity, and a second subset of the set of wake-up signal occasions for link maintenance communications associated with a communication link between the UE and the network entity. The operations of 2005 may be performed in accordance with examples as disclosed herein. In some examples, aspects of the operations of 2005 may be performed by a configuration manager 1225 as described with reference to FIG. 12.

At 2010, the method may include monitoring for a first wake-up signal during a first wake-up signal occasion of the first subset of wake-up signal occasions that indicates a presence of data traffic that is to be transmitted from the UE. The operations of 2010 may be performed in accordance with examples as disclosed herein. In some examples, aspects of the operations of 2010 may be performed by a WUS transmission manager 1230 as described with reference to FIG. 12.

At 2015, the method may include monitoring for a second wake-up signal during a second wake-up signal occasion of the second subset of wake-up signal occasions that indicates a link maintenance associated with the communication link is requested. The operations of 2015 may be performed in accordance with examples as disclosed herein. In some examples, aspects of the operations of 2015 may be performed by a link maintenance manager 1235 as described with reference to FIG. 12.

At 2020, the method may include transmitting a wake-up signal response to the UE responsive to the second wake-up signal. The operations of 2020 may be performed in accordance with examples as disclosed herein. In some examples, aspects of the operations of 2020 may be performed by a WUS response manager 1240 as described with reference to FIG. 12.

Figure 21:
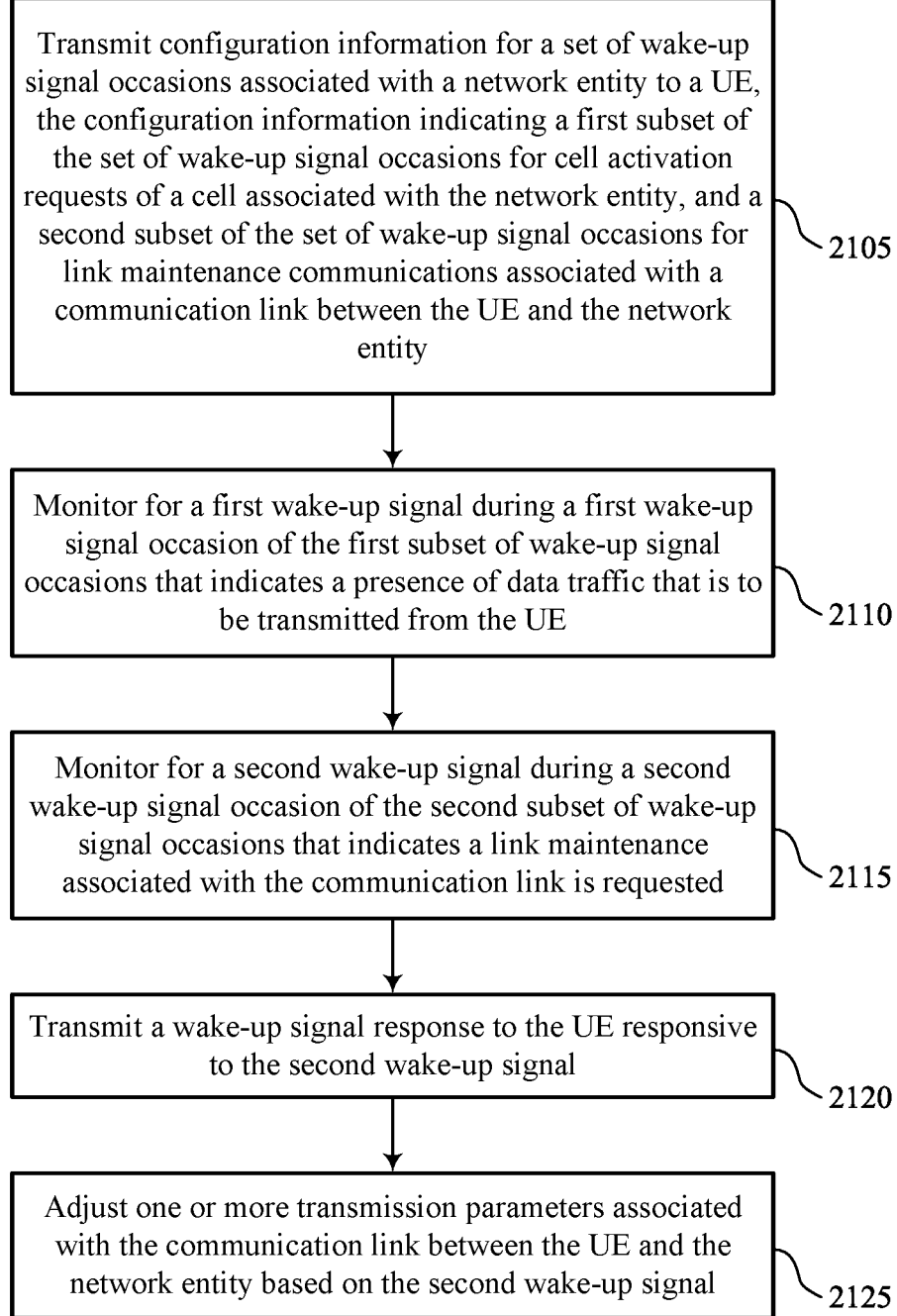

FIG. 21 illustrates a flowchart showing a method 2100 that supports techniques for configuring cell wake-up signal in wireless communications in accordance with one or more aspects of the present disclosure. The operations of the method 2100 may be implemented by a network entity or its components as described herein. For example, the operations of the method 2100 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2105, the method may include transmitting configuration information for a set of wake-up signal occasions associated with a network entity to a UE, the configuration information indicating a first subset of the set of wake-up signal occasions for cell activation requests of a cell associated with the network entity, and a second subset of the set of wake-up signal occasions for link maintenance communications associated with a communication link between the UE and the network entity. The operations of 2105 may be performed in accordance with examples as disclosed herein. In some examples, aspects of the operations of 2105 may be performed by a configuration manager 1225 as described with reference to FIG. 12.

At 2110, the method may include monitoring for a first wake-up signal during a first wake-up signal occasion of the first subset of wake-up signal occasions that indicates a presence of data traffic that is to be transmitted from the UE. The operations of 2110 may be performed in accordance with examples as disclosed herein. In some examples, aspects of the operations of 2110 may be performed by a WUS transmission manager 1230 as described with reference to FIG. 12.

At 2115, the method may include monitoring for a second wake-up signal during a second wake-up signal occasion of the second subset of wake-up signal occasions that indicates a link maintenance associated with the communication link is requested. The operations of 2115 may be performed in accordance with examples as disclosed herein. In some examples, aspects of the operations of 2115 may be performed by a link maintenance manager 1235 as described with reference to FIG. 12.

At 2120, the method may include transmitting a wake-up signal response to the UE responsive to the second wake-up signal. The operations of 2120 may be performed in accordance with examples as disclosed herein. In some examples, aspects of the operations of 2120 may be performed by a WUS response manager 1240 as described with reference to FIG. 12.

At 2125, the method may include adjusting one or more transmission parameters associated with the communication link between the UE and the network entity based on the second wake-up signal. The operations of 2125 may be performed in accordance with examples as disclosed herein. In some examples, aspects of the operations of 2125 may be performed by a link maintenance manager 1235 as described with reference to FIG. 12.

FIG. 22 illustrates a flowchart showing a method 2200 that supports techniques for configuring cell wake-up signal in wireless communications in accordance with one or more aspects of the present disclosure. The operations of the method 2200 may be implemented by a network entity or its components as described herein. For example, the operations of the method 2200 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2205, the method may include transmitting configuration information for a set of wake-up signal occasions associated with a network entity to a UE, the configuration information indicating a first subset of the set of wake-up signal occasions for cell activation requests of a cell associated with the network entity, and a second subset of the set of wake-up signal occasions for link maintenance communications associated with a communication link between the UE and the network entity. The operations of 2205 may be performed in accordance with examples as disclosed herein. In some examples, aspects of the operations of 2205 may be performed by a configuration manager 1225 as described with reference to FIG. 12.

At 2210, the method may include monitoring for a first wake-up signal during a first wake-up signal occasion of the first subset of wake-up signal occasions that indicates a presence of data traffic that is to be transmitted from the UE. The operations of 2210 may be performed in accordance with examples as disclosed herein. In some examples, aspects of the operations of 2210 may be performed by a WUS transmission manager 1230 as described with reference to FIG. 12.

At 2215, the method may include monitoring for a second wake-up signal during a second wake-up signal occasion of the second subset of wake-up signal occasions that indicates a link maintenance associated with the communication link is requested. The operations of 2215 may be performed in accordance with examples as disclosed herein. In some examples, aspects of the operations of 2215 may be performed by a link maintenance manager 1235 as described with reference to FIG. 12.

At 2220, the method may include receiving a link failure indication from the UE that indicates a failure to receive a response to the second wake-up signal. The operations of 2220 may be performed in accordance with examples as disclosed herein. In some examples, aspects of the operations of 2220 may be performed by a link failure manager 1245 as described with reference to FIG. 12.

At 2225, the method may include initiating a beam failure recovery procedure responsive to the link failure indication. The operations of 2225 may be performed in accordance with examples as disclosed herein. In some examples, aspects of the operations of 2225 may be performed by a link failure manager 1245 as described with reference to FIG. 12.

The following provides an overview of aspects of the present disclosure:

Aspect 1: A method for wireless communication at a UE, comprising: receiving configuration information for a set of wake-up signal occasions associated with a network entity, the configuration information indicating a first subset of the set of wake-up signal occasions for cell activation requests of a cell associated with the network entity, and a second subset of the set of wake-up signal occasions for link maintenance communications associated with a communication link between the UE and the network entity; transmitting a first wake-up signal during a first wake-up signal occasion of the first subset of wake-up signal occasions based at least in part on a presence of data traffic that is to be transmitted from the UE; and transmitting a second wake-up signal during a second wake-up signal occasion of the second subset of wake-up signal occasions based at least in part on an elapsed time from a prior communication with the network entity exceeding a threshold value.

Aspect 2: The method of aspect 1, wherein the second wake-up signal indicates that link maintenance of the communication link between the UE and the network entity is requested instead of cell activation of the cell associated with the network entity.

Aspect 3: The method of any of aspects 1 through 2, wherein the receiving the configuration information comprises: receiving one or more of a periodicity or an offset associated with the set of wake-up signal occasions that indicates the second subset of wake-up signal occasions.

Aspect 4: The method of any of aspects 1 through 3, further comprising: resetting the elapsed time from the prior communication responsive to one or more communications with the network entity using the communication link between the UE and the network entity.

Aspect 5: The method of any of aspects 1 through 4, further comprising: resetting the elapsed time from the prior communication responsive to receiving a network response to the first wake-up signal.

Aspect 6: The method of any of aspects 1 through 5, further comprising: receiving a wake-up signal response from the network entity responsive to the second wake-up signal; and resetting the elapsed time from the prior communication responsive to the wake-up signal response.

Aspect 7: The method of aspect 6, wherein the wake-up signal response includes an identification of a source of an associated wake-up signal, and wherein the resetting the elapsed time is responsive to the identification corresponding to an identity of the UE.

Aspect 8: The method of aspect 7, wherein the identification of the source of the associated wake-up signal includes one or more of a random access preamble identification, an identification provided with a scheduling request, a radio network temporary identifier of the UE, or any combinations thereof.

Aspect 9: The method of any of aspects 6 through 8, further comprising: adjusting one or more transmission parameters associated with the communication link between the UE and the network entity based at least in part on the wake-up signal response.

Aspect 10: The method of aspect 9, wherein the wake-up signal response indicates one or more of a transmission power adjustment, a beam update, a transmission configuration indication (TCI) state update, a received power associated with the second wake-up signal, or any combinations thereof.

Aspect 11: The method of any of aspects 1 through 10, further comprising: transmitting a link failure indication to the network entity responsive to a failure to receive a response to the second wake-up signal.

Aspect 12: The method of aspect 11, further comprising: transmitting one or more additional wake-up signals during one or more other wake-up signal occasions of the second subset of wake-up signal occasions responsive to a failure to receive a response to the second wake-up signal; and transmitting the link failure indication to the network entity responsive to a failure to receive a response to the one or more additional wake-up signals.

Aspect 13: The method of any of aspects 11 through 12, wherein the link failure indication is transmitted via a different cell associated with the network entity, using a different wake-up signal occasion of a different wake-up signal configuration, using an initial access procedure, or any combinations thereof.

Aspect 14: A method for wireless communication at a network entity, comprising: transmitting configuration information for a set of wake-up signal occasions associated with a network entity to a UE, the configuration information indicating a first subset of the set of wake-up signal occasions for cell activation requests of a cell associated with the network entity, and a second subset of the set of wake-up signal occasions for link maintenance communications associated with a communication link between the UE and the network entity; monitoring for a first wake-up signal during a first wake-up signal occasion of the first subset of wake-up signal occasions that indicates a presence of data traffic that is to be transmitted from the UE; and monitoring for a second wake-up signal during a second wake-up signal occasion of the second subset of wake-up signal occasions that indicates a link maintenance associated with the communication link is requested.

Aspect 15: The method of aspect 14, wherein the second wake-up signal indicates that link maintenance of the communication link between the UE and the network entity is requested instead of cell activation of the cell associated with the network entity.

Aspect 16: The method of any of aspects 14 through 15, wherein the transmitting the configuration information comprises: transmitting one or more of a periodicity or an offset associated with the set of wake-up signal occasions that indicates the second subset of wake-up signal occasions.

Aspect 17: The method of any of aspects 14 through 16, wherein the transmitting the configuration information comprises: transmitting an indication of a time threshold value associated with the second subset of wake-up signal occasions, wherein a wake-up signal is to be transmitted in the second subset of wake-up signal occasions responsive to an elapsed time from a prior communication via the communication link exceeding the time threshold value.

Aspect 18: The method of any of aspects 14 through 17, further comprising: transmitting a wake-up signal response to the UE responsive to the second wake-up signal.

Aspect 19: The method of aspect 18, wherein the wake-up signal response includes an identification of a source of the second wake-up signal.

Aspect 20: The method of aspect 19, wherein the identification of the source of the second wake-up signal includes one or more of a random access preamble identification, an identification provided with a scheduling request, a radio network temporary identifier of the UE, or any combinations thereof.

Aspect 21: The method of any of aspects 18 through 20, further comprising: adjusting one or more transmission parameters associated with the communication link between the UE and the network entity based at least in part on the second wake-up signal.

Aspect 22: The method of aspect 21, wherein the wake-up signal response indicates one or more of a transmission power adjustment, a beam update, a transmission configuration indication (TCI) state update, a received power associated with the second wake-up signal, or any combinations thereof.

Aspect 23: The method of any of aspects 14 through 22, further comprising: receiving a link failure indication from the UE that indicates a failure to receive a response to the second wake-up signal; and initiating a beam failure recovery procedure responsive to the link failure indication.

Aspect 24: The method of aspect 23, wherein the link failure indication is received via a different cell associated with the network entity, via a different wake-up signal occasion of a different wake-up signal configuration, via an initial access procedure, or any combinations thereof.

Aspect 25: An apparatus for wireless communication at a UE, comprising a processor; memory coupled with the processor; and instructions stored in the memory and executable by the processor to cause the apparatus to perform a method of any of aspects 1 through 13.

Aspect 26: An apparatus for wireless communication at a UE, comprising at least one means for performing a method of any of aspects 1 through 13.

Aspect 27: A non-transitory computer-readable medium storing code for wireless communication at a UE, the code comprising instructions executable by a processor to perform a method of any of aspects 1 through 13.

Aspect 28: An apparatus for wireless communication at a network entity, comprising a processor; memory coupled with the processor; and instructions stored in the memory and executable by the processor to cause the apparatus to perform a method of any of aspects 14 through 24.

Aspect 29: An apparatus for wireless communication at a network entity, comprising at least one means for performing a method of any of aspects 14 through 24.

Aspect 30: A non-transitory computer-readable medium storing code for wireless communication at a network entity, the code comprising instructions executable by a processor to perform a method of any of aspects 14 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving configuration information for a set of wake-up signal occasions associated with a network entity, the configuration information indicating a first subset of the set of wake-up signal occasions for cell activation requests of a cell associated with the network entity, and a second subset of the set of wake-up signal occasions for link maintenance communications associated with a communication link between the UE and the network entity;
   transmitting a first wake-up signal during a first wake-up signal occasion of the first subset of wake-up signal occasions based at least in part on a presence of data traffic that is to be transmitted from the UE;
   transmitting a second wake-up signal during a second wake-up signal occasion of the second subset of wake-up signal occasions based at least in part on an elapsed time from a prior communication with the network entity exceeding a threshold value;
   receiving a wake-up signal response from the network entity indicative of a quality of the communication link between the UE and the network entity responsive to the second wake-up signal; and
   resetting the elapsed time from the prior communication responsive to the wake-up signal response.

2. The method of claim 1, wherein the second wake-up signal indicates that link maintenance of the communication link between the UE and the network entity is requested instead of cell activation of the cell associated with the network entity.

3. The method of claim 1, wherein the receiving the configuration information comprises:
   receiving one or more of a periodicity or an offset associated with the set of wake-up signal occasions that indicates the second subset of wake-up signal occasions.

4. The method of claim 1, further comprising:
   resetting the elapsed time from the prior communication responsive to one or more communications with the network entity using the communication link between the UE and the network entity.

5. The method of claim 1, further comprising:
   resetting the elapsed time from the prior communication responsive to receiving a network response to the first wake-up signal.

6. The method of claim 1, wherein the wake-up signal response includes an identification of a source of an associated wake-up signal, and wherein the resetting the elapsed time is responsive to the identification corresponding to an identity of the UE.

7. The method of claim 6, wherein the identification of the source of the associated wake-up signal includes one or more of a random access preamble identification, an identification provided with a scheduling request, a radio network temporary identifier of the UE, or any combinations thereof.

8. The method of claim 1, further comprising:
   adjusting one or more transmission parameters associated with the communication link between the UE and the network entity based at least in part on the wake-up signal response.

9. The method of claim 8, wherein the wake-up signal response indicates one or more of a transmission power adjustment, a beam update, a transmission configuration indication (TCI) state update, a received power associated with the second wake-up signal, or any combinations thereof.

10. The method of claim 1, further comprising:
   transmitting a third wake-up signal during a third wake-up signal occasion of the second subset of wake-up signal occasions based at least in part on the elapsed time from the prior communication with the network entity exceeding a threshold value; and
   transmitting a link failure indication to the network entity responsive to a failure to receive a response to the third wake-up signal.

11. The method of claim 10, further comprising:
   transmitting one or more additional wake-up signals during one or more other wake-up signal occasions of the second subset of wake-up signal occasions responsive to a failure to receive a response to the third wake-up signal; and transmitting the link failure indication to the network entity responsive to a failure to receive a response to the one or more additional wake-up signals.

12. The method of claim 10, wherein the link failure indication is transmitted via a different cell associated with the network entity, using a different wake-up signal occasion of a different wake-up signal configuration, using an initial access procedure, or any combinations thereof.

13. A method for wireless communication at a network entity, comprising:

transmitting configuration information for a set of wake-up signal occasions associated with a network entity to a user equipment (UE), the configuration information indicating a first subset of the set of wake-up signal occasions for cell activation requests of a cell associated with the network entity, and a second subset of the set of wake-up signal occasions for link maintenance communications associated with a communication link between the UE and the network entity;

monitoring for a first wake-up signal during a first wake-up signal occasion of the first subset of wake-up signal occasions that indicates a presence of data traffic that is to be transmitted from the UE;

monitoring for a second wake-up signal during a second wake-up signal occasion of the second subset of wake-up signal occasions that indicates a link maintenance associated with the communication link is requested; and transmitting a wake-up signal response to the UE indicative of a quality of the communication link between the UE and the network entity responsive to the second wake-up signal.

14. The method of claim 13, wherein the second wake-up signal indicates that link maintenance of the communication link between the UE and the network entity is requested instead of cell activation of the cell associated with the network entity.

15. The method of claim 13, wherein the transmitting the configuration information comprises:

transmitting one or more of a periodicity or an offset associated with the set of wake-up signal occasions that indicates the second subset of wake-up signal occasions.

16. The method of claim 13, wherein the transmitting the configuration information comprises:

transmitting an indication of a time threshold value associated with the second subset of wake-up signal occasions, wherein a wake-up signal is to be transmitted in the second subset of wake-up signal occasions responsive to an elapsed time from a prior communication via the communication link exceeding the time threshold value.

17. The method of claim 13, wherein the wake-up signal response includes an identification of a source of the second wake-up signal.

18. The method of claim 17, wherein the identification of the source of the second wake-up signal includes one or more of a random access preamble identification, an identification provided with a scheduling request, a radio network temporary identifier of the UE, or any combinations thereof.

19. The method of claim 13, further comprising:

adjusting one or more transmission parameters associated with the communication link between the UE and the network entity based at least in part on the second wake-up signal.

20. The method of claim 19, wherein the wake-up signal response indicates one or more of a transmission power adjustment, a beam update, a transmission configuration indication (TCI) state update, a received power associated with the second wake-up signal, or any combinations thereof.

21. The method of claim 13, further comprising:

receiving a link failure indication from the UE that indicates a failure to receive a response to a third wake-up signal during a third wake-up signal occasion of the second subset of wake-up signal occasions; and initiating a beam failure recovery procedure responsive to the link failure indication.

22. The method of claim 21, wherein the link failure indication is received via a different cell associated with the network entity, via a different wake-up signal occasion of a different wake-up signal configuration, via an initial access procedure, or any combinations thereof.

23. An apparatus for wireless communication at a user equipment (UE), comprising:

one or more processors;

one or more memories coupled with the one or more processors; and instructions stored in the one or more memories and executable by the one or more processors to cause the apparatus to:

receive configuration information for a set of wake-up signal occasions associated with a network entity, the configuration information indicating a first subset of the set of wake-up signal occasions for cell activation requests of a cell associated with the network entity, and a second subset of the set of wake-up signal occasions for link maintenance communications associated with a communication link between the UE and the network entity;

transmit a first wake-up signal during a first wake-up signal occasion of the first subset of wake-up signal occasions based at least in part on a presence of data traffic that is to be transmitted from the UE;

transmit a second wake-up signal during a second wake-up signal occasion of the second subset of wake-up signal occasions based at least in part on an elapsed time from a prior communication with the network entity exceeding a threshold value;

receiving a wake-up signal response from the network entity indicative of a quality of the communication link between the UE and the network entity responsive to the second wake-up signal; and resetting the elapsed time from the prior communication responsive to the wake-up signal response.

24. The apparatus of claim 23, wherein the second wake-up signal indicates that link maintenance of the communication link between the UE and the network entity is requested instead of cell activation of the cell associated with the network entity.

25. An apparatus for wireless communication at a network entity, comprising:

one or more processors;

one or more memories coupled with the one or more processors; and instructions stored in the one or more memories and executable by the one or more processors to cause the apparatus to:

transmit configuration information for a set of wake-up signal occasions associated with a network entity to a user equipment (UE), the configuration information indicating a first subset of the set of wake-up signal occasions for cell activation requests of a cell associated with the network entity, and a second subset of the set of wake-up signal occasions for link maintenance communications associated with a communication link between the UE and the network entity;

monitor for a first wake-up signal during a first wake-up signal occasion of the first subset of wake-up signal occasions that indicates a presence of data traffic that is to be transmitted from the UE;

monitor for a second wake-up signal during a second wake-up signal occasion of the second subset of wake-up signal occasions that indicates a link maintenance associated with the communication link is requested; and transmit a wake-up signal response to the UE indicative of a quality of the communication link between the UE and the network entity responsive to the second wake-up signal.

26. The apparatus of claim 25, wherein the second wake-up signal indicates that link maintenance of the communication link between the UE and the network entity is requested instead of cell activation of the cell associated with the network entity.

27. The apparatus of claim 25, wherein the instructions to transmit the configuration information are executable by the one or more processors to cause the apparatus to:

transmit an indication of a time threshold value associated with the second subset of wake-up signal occasions, wherein a wake-up signal is to be transmitted in the second subset of wake-up signal occasions responsive to an elapsed time from a prior communication via the communication link exceeding the time threshold value.

* * * * *